United States Patent
Watanabe et al.

(10) Patent No.: US 12,146,552 B2
(45) Date of Patent: Nov. 19, 2024

(54) BALL SCREW DEVICE AND MANUFACTURING METHOD THEREOF

(71) Applicant: NSK LTD., Tokyo (JP)

(72) Inventors: Yasumi Watanabe, Fujisawa (JP); Ryo Segawa, Fujisawa (JP); Tomoko Miyamori, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/265,557

(22) PCT Filed: Aug. 3, 2022

(86) PCT No.: PCT/JP2022/029813
§ 371 (c)(1),
(2) Date: Jun. 6, 2023

(87) PCT Pub. No.: WO2023/026808
PCT Pub. Date: Mar. 2, 2023

(65) Prior Publication Data
US 2024/0026959 A1    Jan. 25, 2024

(30) Foreign Application Priority Data

Aug. 24, 2021 (JP) ................................. 2021-136411
Aug. 24, 2021 (JP) ................................. 2021-136412

(51) Int. Cl.
*F16H 25/20* (2006.01)
*F16H 25/22* (2006.01)

(52) U.S. Cl.
CPC ..... *F16H 25/2204* (2013.01); *F16H 25/2015* (2013.01); *F16H 2025/204* (2013.01)

(58) Field of Classification Search
CPC ................... B60T 13/745; F16H 25/24; F16H 2025/2481; F16H 2025/204
See application file for complete search history.

(56) References Cited

U.S. PATENT DOCUMENTS

| | | | | |
|---|---|---|---|---|
| 9,976,638 B2* | 5/2018 | Baukholt | ................ | F16H 25/24 |
| 2021/0364070 A1* | 11/2021 | Keranen | ............. | F16H 25/2252 |

FOREIGN PATENT DOCUMENTS

| | | | |
|---|---|---|---|
| JP | 2003-194174 A | | 7/2003 |
| JP | 2004-169713 A | | 6/2004 |
| JP | 2008101646 A | * | 5/2008 |
| JP | 2014-145465 A | | 8/2014 |
| JP | 2016-35322 A | | 3/2016 |
| WO | 2019/194143 A1 | | 10/2019 |

OTHER PUBLICATIONS

International Search Report for PCT/JP2022/029813 dated Oct. 18, 2022.
Written Opinion for PCT/JP2022/029813 dated Oct. 18, 2022.

* cited by examiner

*Primary Examiner* — Gregory Robert Weber
(74) *Attorney, Agent, or Firm* — Sughrue Mion, PLLC

(57) ABSTRACT

The nut has a first fitting surface provided with a first retaining ring groove on an end portion on the other side in the axial direction; the fitting cylinder, at an end portion on the one side in the axial direction, has a second fitting surface provided with a second retaining ring groove in a portion facing the first retaining ring groove with regard to a radial direction; and the retaining ring is engaged so as to span between the first retaining ring groove and the second retaining ring groove.

16 Claims, 23 Drawing Sheets

BALL SCREW DEVICE AND MANUFACTURING METHOD THEREOF

CROSS REFERENCE TO RELATED APPLICATIONS

This application is a National Stage of International Application No. PCT/JP2022/029813 filed Aug. 3, 2022, claiming priority based on Japanese Patent Application No. 2021-136411 filed Aug. 24, 2021 and Japanese Patent Application No. 2021-136412 filed Aug. 24, 2021.

TECHNICAL FIELD

The present disclosure relates to a ball screw device and a manufacturing method thereof.

BACKGROUND OF INVENTION

In a ball screw device, balls are rolled and moved between a screw shaft and a nut, and thus higher efficiency may be obtained compared to a slide screw device in which there is direct contact between the screw shaft and the nut. For this reason, ball screw devices are incorporated in various kinds of mechanical devices such as electric brake devices or automatic manual transmissions (AMT) of automobiles, positioning devices of machine tools, and the like, in order to convert rotational motion of a drive source such as an electric motor into linear motion.

A ball screw device includes a screw shaft having a spiral-shaped shaft-side ball screw groove on an outer peripheral surface thereof, a nut having a spiral-shaped nut-side ball screw groove on an inner peripheral surface thereof, and balls arranged between the shaft-side ball screw groove and the nut-side ball screw groove. In a ball screw device, depending on the application, one of the screw shaft and the nut is used as a rotational motion element, and the other of the screw shaft and the nut is used as a linear motion element.

In a ball screw device, a piston or the like that is fixed to the nut used as a linear motion element is often used. FIG. 23 illustrates a conventional structure of a ball screw device as described in JP 2016-035322 A, in which a ball screw device 100 has a structure in which a piston 104 is fitted and fixed to a nut 102.

The ball screw device 100 includes a screw shaft 101, the nut 102, balls 103, the piston 104, and a housing (caliper) 105.

The screw shaft 101 has a spiral-shaped shaft-side ball screw groove 106 on an outer peripheral surface thereof, and undergoes rotational motion during use. Therefore, the screw shaft 101 is a rotational motion element and is rotatably supported by a rolling bearing 107 with respect to the housing 105. A driven gear 108 is fixed to the screw shaft 101. Rotation of an output shaft of an electric motor (not illustrated) is transmitted to the driven gear 108 through an idle gear 109. Therefore, the screw shaft 101 is rotationally driven based on electric current flowing to the electric motor.

The nut 102 has a spiral-shaped nut-side ball screw groove 110 on an inner peripheral surface thereof and undergoes linear motion during use. Therefore, the nut 102 is a linear motion element and is prevented from rotating relative to the housing 105 as will be described later.

The screw shaft 101 is inserted inside the nut 102 and is arranged coaxially with the nut 102. The shaft-side ball screw groove 106 and the nut-side ball screw groove 110 are arranged so as to face each other in a radial direction, forming a spiral-shaped load path 111.

A start point and an end point of the load path 111 are connected by a circulation means (not illustrated). The balls 103 that have reached the end point of the load path 111 are returned to the start point of the load path 111 through the circulation means. Note that the start point and end point of the load path 111 are interchanged according to the relative displacement direction (relative rotation direction) in the axial direction between the screw shaft 101 and the nut 102.

The piston 104 has a cylindrical shape with a bottom, and is fitted and fixed to the nut 102 so as not to be capable of relative rotation. In particular, in the ball screw device 100 having the conventional structure, the piston 104 is externally fitted over the nut 102 so as to cover the entire nut 102. In other words, the nut 102 is inserted entirely inside the piston 104.

In the ball screw device 100 of the conventional structure, in order to prevent relative displacement in the axial direction between the nut 102 and the piston 104, an end surface in the axial direction of the nut 102 abuts against a stepped surface 112 provided on an inner peripheral surface of the piston 104, and a retaining ring 113 is engaged with and locked to the inner peripheral surface of the piston 104. As a result, the nut 102 is sandwiched between the stepped surface 112 and the retaining ring 113 from both sides in the axial direction, which prevents the nut 102 from being displaced relative to the piston 104 in the axial direction.

In addition, in order to prevent the nut 102 from rotating relative to the housing 105, a key groove 114 extending in the axial direction is provided on an outer peripheral surface of the piston 104, which is externally fitted to the nut 102 so as not to be capable of relative rotation with respect to the nut 102.

The housing 105 has an insertion hole (cylinder hole) 115 through which the piston 104 can be inserted in the axial direction. A fitting groove 116 is provided on an inner peripheral surface of the insertion hole 115. A key 117 is fitted in the fitting groove 116. A portion of the key 117 projecting inward in the radial direction from the inner peripheral surface of the insertion hole 115 is engaged with the key groove 114 provided on the outer peripheral surface of the piston 104 so as to slide in the axial direction. Such a configuration prevents the nut 102 from rotating relative to the housing 105 and allows linear motion of the nut 102.

CITATION LIST

Patent Literature

Patent Literature 1: JP 2016-035322 A

SUMMARY

Problem to be Solved

In the ball screw device 100 having a conventional structure, in order to prevent relative displacement in the axial direction between the nut 102 and the piston 104, the piston 104 is externally fitted over the nut 102 so as to cover the entire nut 102, and the nut 102 is sandwiched from both sides in the axial direction between the stepped surface 112 provided on the inner peripheral surface of the piston 104 and the retaining ring 113 engaged with the inner peripheral surface of the piston 104.

Therefore, it is necessary to make an inner diameter of the piston 104 larger than an outer diameter (maximum outer diameter) of the nut 102, which tends to increase the size of the ball screw device 100. In addition, the outer diameter of the nut 102 is restricted by the inner diameter of the piston 104, which is disadvantageous in increasing a load capacity of the ball screw device 100.

On the other hand, it is conceivable to prevent relative displacement in the axial direction between the nut and the piston by just directly press-fitting a portion in the axial direction of the piston to a portion in the axial direction of the nut. However, in this case, depending on a combination of metal (such as iron-based alloy) that constitutes the nut, and metal (such as aluminum-based alloy) that constitutes the piston, interference may decrease due to a difference in coefficients of thermal expansion, which may make it impossible to effectively prevent displacement in the axial direction of the nut and piston. In order to effectively prevent displacement in the axial direction between the nut and the piston, it is necessary to strictly manage the press-fitting interference, which may cause an increase in the manufacturing cost of the ball screw device.

In addition, it is also possible to fix the piston and nut by welding; however, in this case as well, depending on a combination of metal (such as iron-based alloy) that constitutes the nut, and metal (such as aluminum-based alloy) that constitutes the piston, intermetallic compounds may form during welding, resulting in insufficient joint strength. As a result, there is a possibility that it will become impossible to effectively prevent displacement in the axial direction between the nut and the piston.

The technique according to the present disclosure has been made to solve the above problems described above, and an object according to the present disclosure is to provide a ball screw device that can effectively prevent relative displacement in the axial direction between a nut and a fitting cylinder without increasing manufacturing costs, and that can reduce the size of the entire device and increase the load capacity.

In addition, an object according to the present disclosure is to provide a ball screw device in which whether or not a retaining ring is assembled can be easily confirmed after assembly, if necessary.

Solution to Problem

A ball screw device according to an aspect of the present disclosure includes a screw shaft, a nut, balls, a fitting cylinder, and a retaining ring.

The screw shaft has a shaft-side ball screw groove with a spiral shape on an outer peripheral surface and is configured to undergo rotational motion during use.

The nut has a nut-side ball screw groove with a spiral shape on an inner peripheral surface and is configured to undergo linear motion during use.

The balls are arranged between the shaft-side ball screw groove and the nut-side ball screw groove.

The fitting cylinder has an end portion on one side in an axial direction that is fitted and fixed to an end portion on an other side in the axial direction of the nut and is configured to undergo linear motion together with the nut.

The retaining ring is configured to prevent relative displacement in the axial direction between the nut and the fitting cylinder.

In the ball screw device according to an aspect of the present disclosure, the nut has a first fitting surface provided with a first retaining ring groove at an end portion on the other side in the axial direction, and the fitting cylinder, at an end portion on the one side in the axial direction, has a second fitting surface provided with a second retaining ring groove in a portion facing the first retaining ring groove with regard to a radial direction.

The retaining ring is engaged so as to span between the first retaining ring groove and the second retaining ring groove.

In the ball screw device according to an aspect of the present disclosure, a maximum outer diameter of the fitting cylinder may be the same as a maximum outer diameter of the nut. Note that making the maximum outer diameter of the fitting cylinder the same as the maximum outer diameter of the nut is not limited to a case where the maximum outer diameter of the fitting cylinder is completely matched with the maximum outer diameter of the nut, including a case where the maximum outer diameter of the fitting cylinder is made substantially the same as the maximum outer diameter of the nut within an inevitable manufacturing tolerance range.

In the ball screw device according to an aspect of the present disclosure, the fitting cylinder may be fitted to the nut by press fitting or clearance fitting.

In a case where the fitting cylinder is fitted to the nut by press fitting, the first fitting surface and the second fitting surface may be brought into contact over the entire length in the axial direction with interference, or may be brought into contact with interference in a part of the axial direction.

In the ball screw device according to an aspect of the present disclosure, the cross-sectional shape of the retaining ring may be rectangular or circular.

In the ball screw device according to an aspect of the present disclosure, an end surface on the other side in the axial direction of the nut and the first fitting surface may be connected through a first chamfered portion, and an end surface on the one side in the axial direction of the fitting cylinder and the second fitting surface may be connected through a second chamfered portion.

In the ball screw device according to an aspect of the present disclosure, when the nut is moved to the other side in the axial direction relative the screw shaft, an axial force may be transmitted between the nut and the fitting cylinder by using the end surface on the other side in the axial direction of the nut or the end surface on the one side in the axial direction of the fitting cylinder, and when the nut is moved to the one side in the axial direction relative the screw shaft, an axial force may be transmitted between the nut and the fitting cylinder through the retaining ring.

In the ball screw device according to an aspect of the present disclosure, an outer peripheral surface of the nut may include the first fitting surface, a large-diameter surface arranged adjacent on the one side in the axial direction of the first fitting surface and having an outer diameter larger than that of the first fitting surface, and a stepped surface arranged between the first fitting surface and the large diameter surface and facing the other side in the axial direction.

The fitting cylinder may be externally fitted and fixed to the nut, with an end surface on the one side in the axial direction thereof abutting against the stepped surface in the axial direction.

In this case, when relatively moving the nut to the other side in the axial direction with respect to the screw shaft, the axial force may be transmitted between the nut and the fitting cylinder through an abutting portion between the end surface on the one side in the axial direction of the fitting cylinder and the stepped surface of the nut.

In a case of adopting the above configuration in which the fitting cylinder is externally fitted and fixed to the nut, the first retaining ring groove may be formed based on the stepped surface of the nut, and the second retaining ring groove may be formed based on the end surface on the one side in the axial direction of the fitting cylinder.

In a case of adopting the above configuration in which the fitting cylinder is externally fitted and fixed to the nut, the first retaining ring groove may be provided in a portion separated in the axial direction from the nut-side ball screw groove.

In a case of adopting the above configuration in which the fitting cylinder is externally fitted and fixed to the nut, the fitting cylinder may be provided with a small-diameter stepped portion at an end portion on the one side in the axial direction of an outer peripheral surface the fitting cylinder.

In a case of adopting the above configuration in which the fitting cylinder is externally fitted and fixed to the nut, a housing having an insertion hole through which the nut and the fitting cylinder can be inserted in the axial direction; and a rotation-locking member configured to prevent relative rotation of the nut with respect to the housing may be provided.

In this case, the insertion hole may have a guide recessed groove capable of engaging in a circumferential direction with a portion on an outer side with regard to the radial direction of the rotation-locking member and extending in the axial direction, on an inner peripheral surface thereof and the nut may have a holding recessed portion capable of engaging in the circumferential direction with a portion on an inner side with regard to the radial direction of the rotation-locking member, including a blocking surface facing toward the other side in the axial direction, and open to the stepped surface, on the large-diameter surface.

In addition, the rotation-locking member can be configured that the portion on the inner side with regard to the radial direction is arranged inside the holding recessed portion with being sandwiched between the blocking surface and an end surface on the one side in the axial direction of the fitting cylinder, and the portion on the outer side with regard to the radial direction is arranged inside the guide recessed groove so as to slide in the axial direction.

In this case, a dimension in the axial direction of the rotation-locking member may be made smaller than a distance in the axial direction between the blocking surface and the end surface on the one side in the axial direction of the fitting cylinder (stepped surface of the nut).

Alternatively, the dimension in the axial direction of the rotation-locking member may be the same as the distance in the axial direction between the blocking surface and the end surface on the one side in the axial direction of the fitting cylinder.

The dimension in the axial direction of the rotation-locking member may be larger than the distance in the axial direction between the blocking surface and the stepped surface of the nut. In this case, the end surface on the one side in the axial direction of the fitting cylinder may abut against the end surface on the other side in the axial direction of the rotation-locking member.

In the ball screw device according to an aspect of the present disclosure, an outer peripheral surface of the fitting cylinder may have the second fitting surface, a large-diameter surface arranged adjacent on the other side in the axial direction of the second fitting surface and having an outer diameter larger than that of the second fitting surface, and a stepped surface arranged between the second fitting surface and the large diameter surface and facing the one side in the axial direction.

The fitting cylinder may be internally fitted and fixed to the nut, and the stepped surface may abut in the axial direction against an end surface on the other side in the axial direction of the nut.

In this case, when relatively moving the nut to the other side in the axial direction with regard to the screw shaft, an axial force may be transmitted between the nut and the fitting cylinder through an abutting portion between the stepped surface of the fitting cylinder and an end surface on the other side in the axial direction of the nut.

In a case of adopting the above configuration in which the fitting cylinder is internally fitted and fixed to the nut, the first retaining ring groove may be formed based on the end surface on the other side in the axial direction of the nut, and the second retaining ring groove may be formed based on the stepped surface of the fitting cylinder.

In a case of adopting the above configuration in which the fitting cylinder is internally fitted and fixed to the nut, the nut may have a small-diameter stepped portion at an end portion on the other side in the axial direction of the outer peripheral surface of the nut.

In a case of adopting the above configuration in which the fitting cylinder is internally fitted and fixed to the nut, a housing having an insertion hole through which the nut and the fitting cylinder can be inserted in the axial direction; and a rotation-locking member configured to prevent relative rotation of the nut with respect to the housing may be provided.

In this case, the insertion hole may have a guide recessed groove capable of engaging in the circumferential direction with a portion on an outer side in the radial direction of the rotation-locking member and extending in the axial direction, on an inner peripheral surface thereof, and the fitting cylinder may have a holding recessed portion capable of engaging in the circumferential direction with a portion on an inner side in the radial direction of the rotation-locking member, including a blocking surface facing toward the one side in the axial direction, and open to the stepped surface, on the large-diameter surface thereof.

In addition, the rotation-locking member may be configured that the portion on the inner side in the radial direction is arranged inside the holding recessed portion with be sandwiched between the blocking surface and the end surface on the other side in the axial direction of the nut, the portion on the outer side in the radial direction is arranged inside the guide recessed groove so as to slide in the axial direction.

In this case, a dimension in the axial direction of the rotation-locking member may be made smaller than a distance in the axial direction between the blocking surface and the end surface on the other side in the axial direction of the nut (stepped surface of the fitting cylinder).

Alternatively, the dimension in the axial direction of the rotation-locking member may be the same as the distance in the axial direction between the blocking surface and the end surface on the other side in the axial direction of the nut.

The axial dimension of the rotation-locking member may be larger than the distance in the axial direction between the blocking surface and the stepped surface of the fitting cylinder. In this case, the end surface on the other side in the axial direction of the nut may abut against the end surface on the one side in the axial direction of the rotation-locking member.

In the ball screw device according to an aspect of the present disclosure, of an end portion on the other side in the axial direction of the nut and an end portion on the one side in the axial direction of the fitting cylinder, one end portion that covers the retaining ring from outside in the radial direction may be provided with a confirmation window hole penetrating in the radial direction at a portion overlapping the retaining ring in the radial direction.

In the ball screw device according to an aspect of the present disclosure, the confirmation window hole may be open only on both sides in the radial direction.

Alternatively, the confirmation window hole may be open not only on both sides in the radial direction but also in the axial direction.

In the ball screw device according to an aspect of the present disclosure, the retaining ring may have a discontinuous portion at one location in the circumferential direction; and a width dimension in the circumferential direction of the confirmation window hole may be larger than a width dimension in the circumferential direction of the discontinuous portion.

Alternatively, the retaining ring may have a discontinuous portion at one location in the circumferential direction; and the confirmation window holes may be provided at a plurality of locations in the circumferential direction of the one end portion; and an interval between a pair of the confirmation window holes adjacent in the circumferential direction may be larger than the width dimension in the circumferential direction of the discontinuous portion.

A manufacturing method of a ball screw device according to an aspect of the present disclosure is a manufacturing method for manufacturing a ball screw device according to an aspect of the present disclosure and includes an inspection step of inspecting whether or not the retaining ring is properly assembled; the inspection step including a step of inserting a tip-end portion of an inspection jig inside the confirmation window hole from outside in the radial direction, and measuring an insertion depth of the tip-end portion of the inspection jig, or a step of measuring a distance from a sensor to an object (the outer peripheral surface of the retaining ring or the bottom surface of the first retaining ring groove or the second retaining ring groove) by using the confirmation window hole.

Advantageous Effect

With the ball screw device according to an aspect of the present disclosure, it is possible to effectively prevent relative displacement in the axial direction of a nut and fitting cylinder, as well as reduce the size of the entire device and increase load capacity without increasing manufacturing costs.

BRIEF DESCRIPTIONS OF THE DRAWINGS

DESCRIPTION OF EMBODIMENTS

First Example

Figure 1:
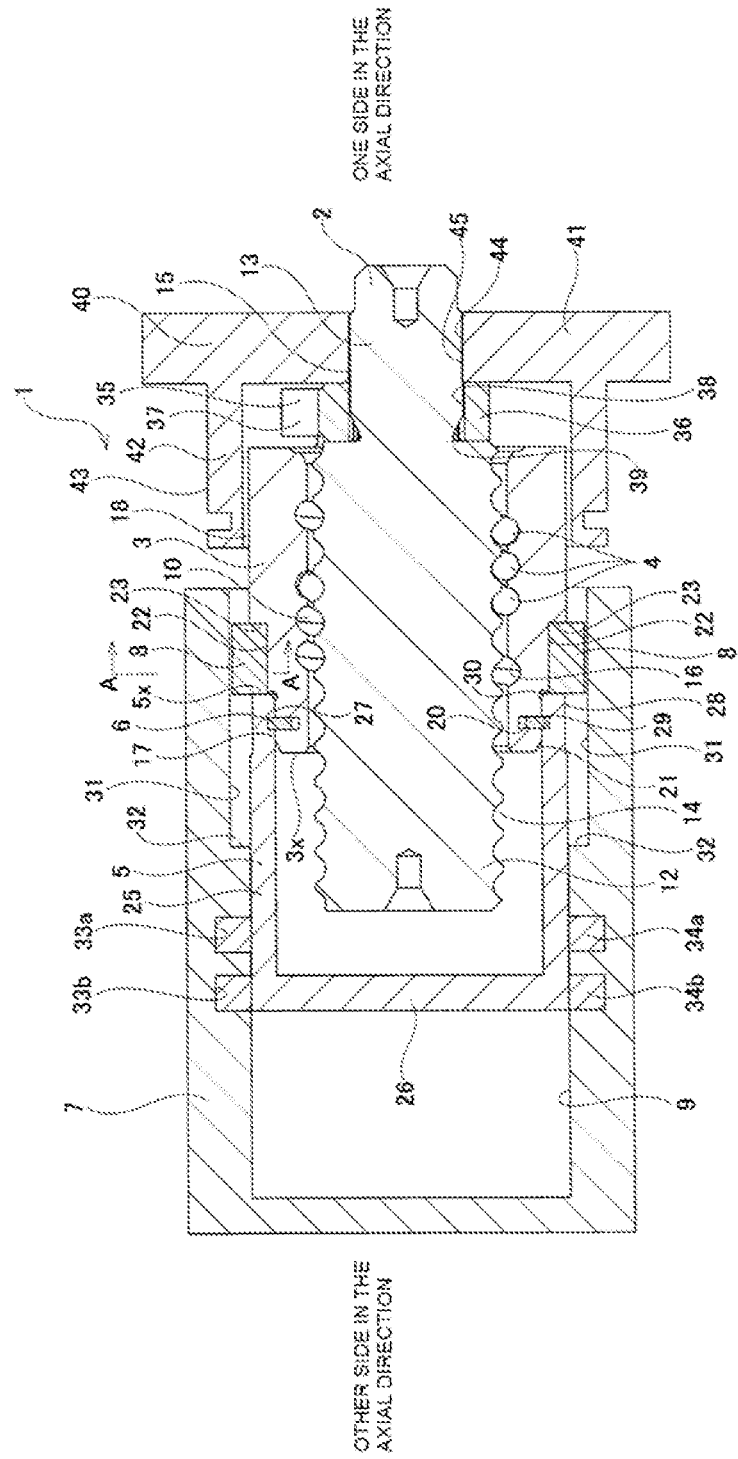
FIG. 1 is a cross-sectional view of a ball screw device of a first example of an embodiment according to the present disclosure.
Figure 2:
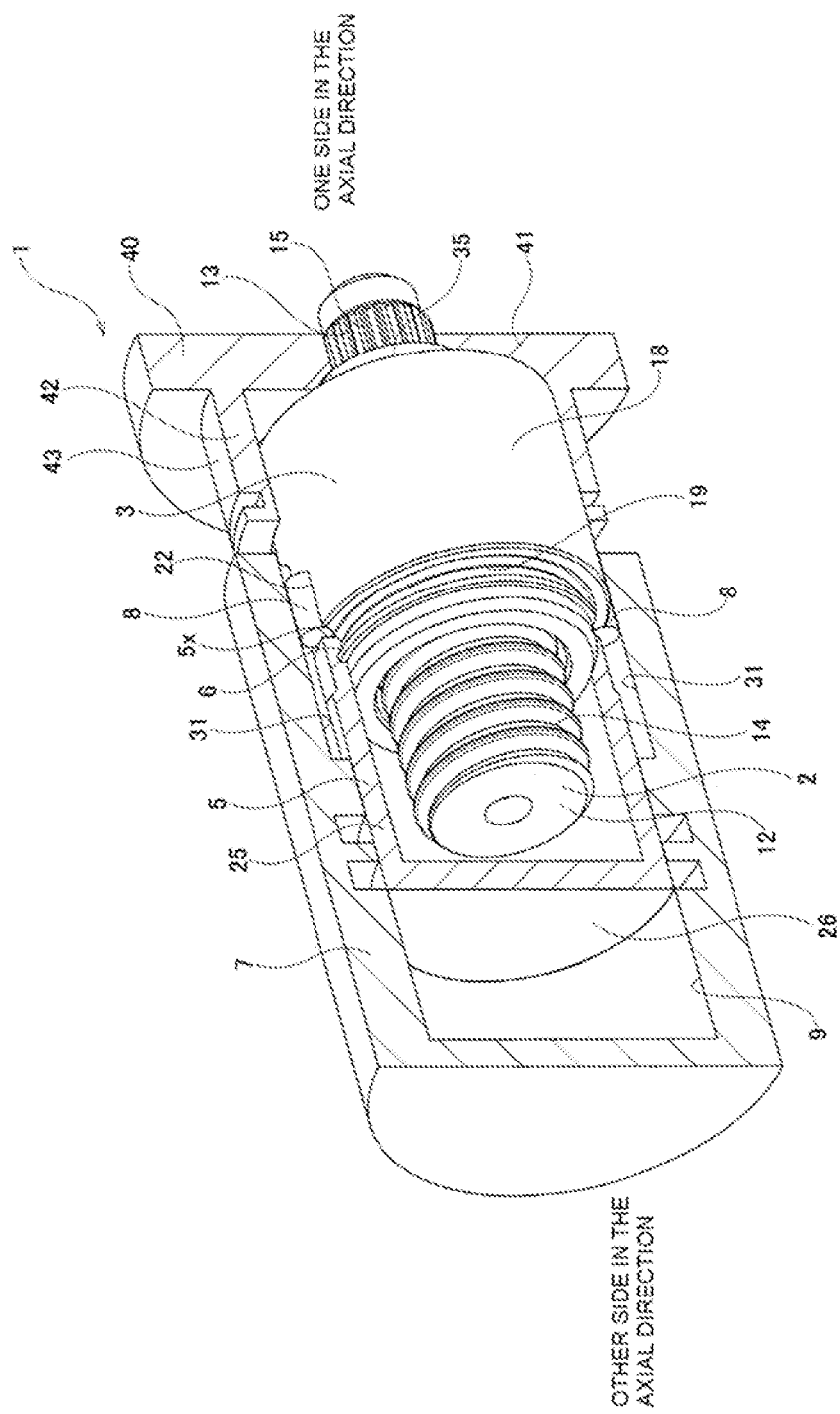
FIG. 2 is a partial cross-sectional perspective view of the ball screw device of the first example.
Figure 3:
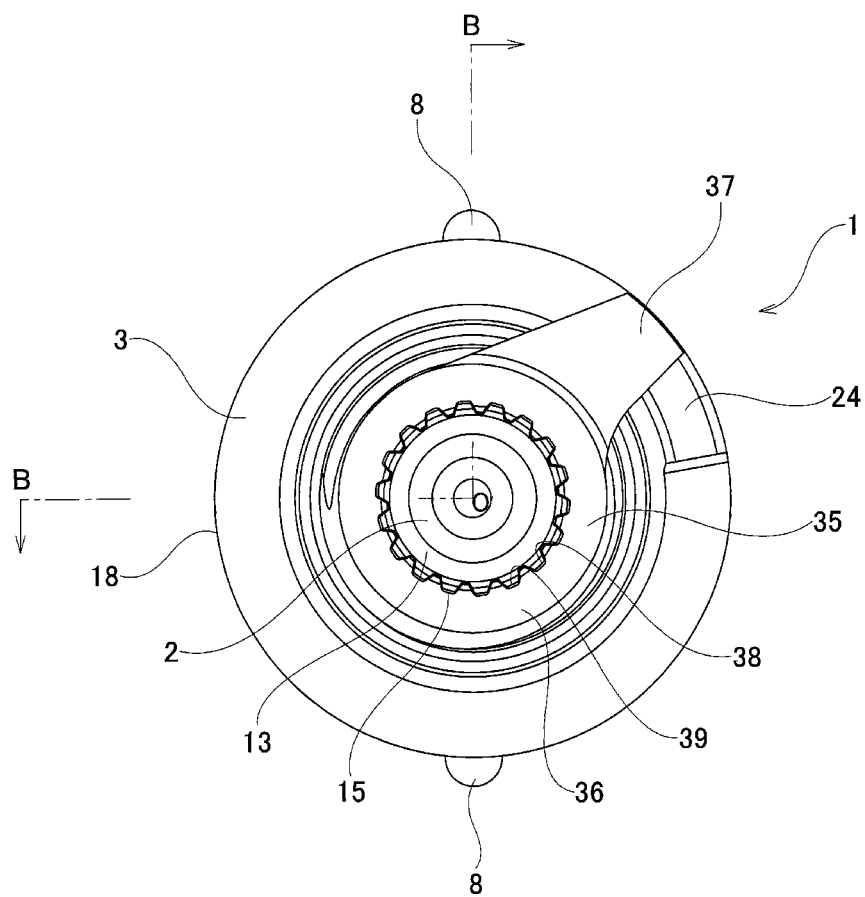
FIG. 3 is a front view of the ball screw device of the first example, omitting a housing and a drive member, as viewed from one side in the axial direction.
Figure 4:
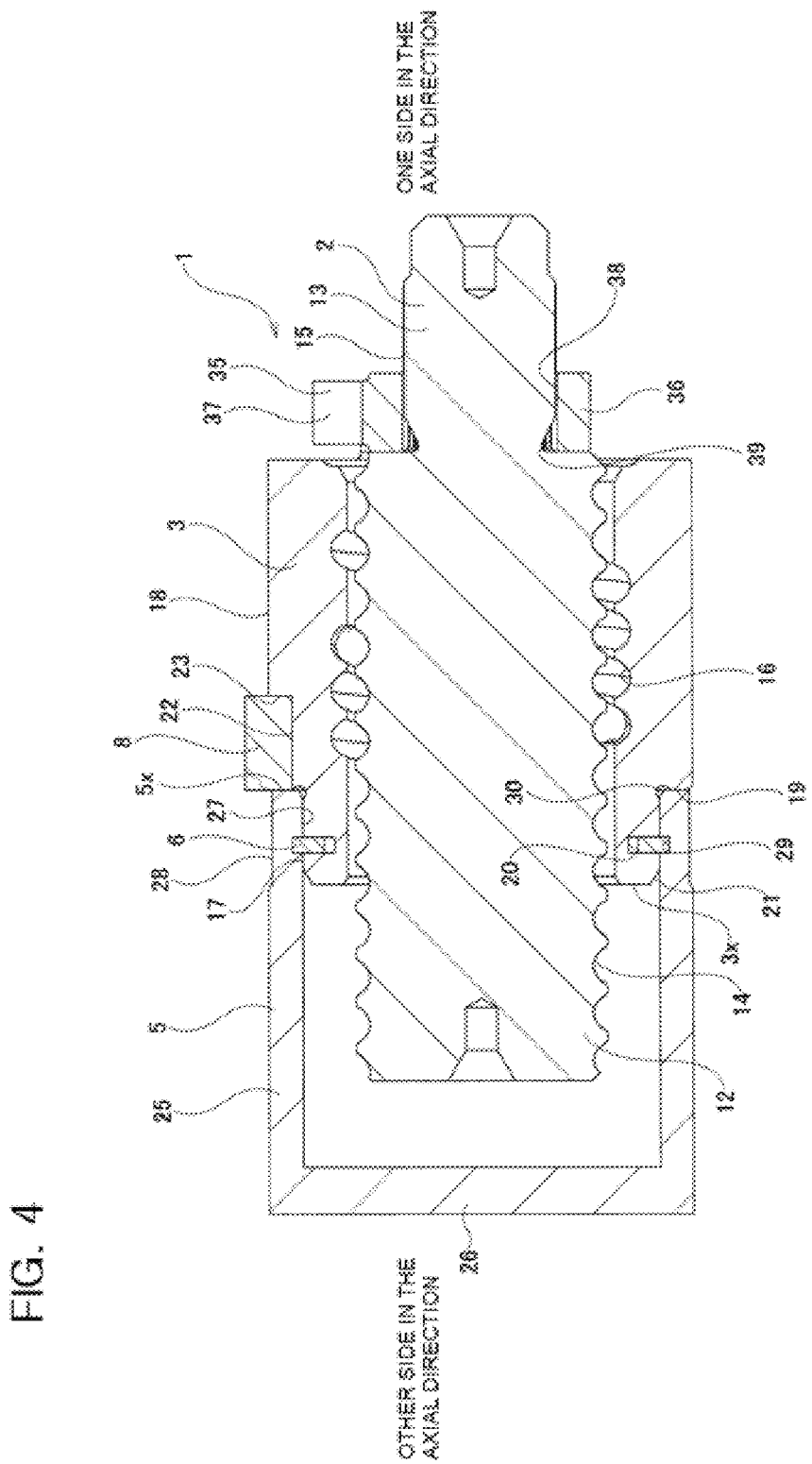
FIG. 4 is a cross-sectional view taken along line B-O-B of FIG. 3.

A first example of an embodiment according to the present disclosure will be described with reference to FIG. 1 to FIG. 9.

[Overall Configuration of Ball Screw Device]

A ball screw device 1 of the present example can be incorporated in, for example, an electric brake booster device and used for converting rotational motion of an electric motor (not illustrated), which is a drive source, into linear motion of a piston 5.

The ball screw device 1 includes a screw shaft 2, a nut 3, balls 4, the piston 5 that is a fitting cylinder, a retaining ring 6, a housing 7, and a rotation-lock member 8.

The screw shaft 2 is a rotational motion element that is rotationally driven by a drive source (not illustrated) and undergoes rotational motion during use. The screw shaft 2 is inserted through the inside of the nut 3 and arranged coaxially with the nut 3. The nut 3 is a linear motion element that undergoes linear motion inside an insertion hole 9 provided in the housing 7 together with the piston 5 externally fitted and fixed to the nut 3. The retaining ring 6 prevents the nut 3 from relative displacement in the axial direction with respect to the piston 5, and the rotation-lock member 8 prevents the nut 3 from relative rotation with respect to the housing 7. The ball screw device 1 of the present example is used in such a manner as to rotationally drive the screw shaft 2 and move the nut 3 in a linear motion.

A spiral-shaped load path 10 is provided between an outer peripheral surface of the screw shaft 2 and an inner peripheral surface of the nut 3. The balls 4 are rotatably arranged in the load path 10. When the screw shaft 2 and the nut 3 are relatively rotated, the balls 4 that have reached an end point of the load path 10 are returned to a start point of the load path 10 through a circulation groove 11 (see FIG. 7) formed on the inner peripheral surface of the nut 3. The structure of each component of the ball screw device 1 will be described below.

In the following description, axial direction, radial direction, and circumferential direction refer to the axial direction, radial direction, and circumferential direction with respect to the screw shaft, unless otherwise specified. In addition, one side in the axial direction refers to the right side in FIGS. 1, 2, 4, 5, 7, and 9, and the other side in the axial direction refers to the left side in FIGS. 1, 2, 4, 5, 7, and 9.

<Screw Shaft>

The screw shaft 2 is made of metal, and has a screw portion 12 and a fitting shaft portion 13 adjacently arranged on the one side in the axial direction side of the screw portion 12. The screw portion 12 and the fitting shaft portion 13 are coaxially arranged and integrally formed with each other. The fitting shaft portion 13 has an outer diameter smaller than that of the screw portion 12.

The screw portion 12 has a shaft-side ball screw groove 14 having a spiral shape on an outer peripheral surface thereof. The shaft-side ball screw groove 14 is formed on the outer peripheral surface of the screw portion 12 by, for example, grinding (cutting) or rolling. In this example, the number of threads of the shaft-side ball screw groove 14 is one. The cross-sectional groove shape (groove bottom shape) of the shaft-side ball screw groove 14 can be a gothic arch groove or a circular arc groove.

The fitting shaft portion 13 has male spline teeth 15 over the entire circumference of an outer peripheral surface thereof. Therefore, the fitting shaft portion 13 corresponds to a spline shaft portion. In the illustrated example, the male spline teeth 15 are configured by involute spline teeth, but they may also be configured by angular spline teeth. Alternatively, the fitting shaft portion 13 may be a serrated shaft portion having male serrations over the entire circumference of the outer peripheral surface.

The screw shaft 2, in a state in which the screw portion 12 is inserted inside the nut 3, is arranged coaxially with the nut 3. Note that, in the present example, the screw shaft 2 includes the screw portion 12 and the fitting shaft portion 13; however, the screw shaft 2 may also be provided with a support shaft portion (second fitting shaft portion) or the like that secures a rolling bearing or the like for supporting the screw shaft 2 so as to be able to rotate with respect to the housing 7 or the like.

<Nut>

The nut 3 is made of a metal such as an iron-based alloy, and has a cylindrical shape as a whole. The nut 3 has a nut-side ball screw groove 16 having a spiral shape and a circulation groove 11 on the inner peripheral surface thereof.

The nut-side ball screw groove 16 is formed by subjecting the inner peripheral surface of the nut 3 to grinding (cutting) or rolling and tapping (cutting and tapping), for example. The nut-side ball screw groove 16 has the same lead as the shaft-side ball screw groove 14. Therefore, in a state in which the screw portion 12 of the screw shaft 2 is inserted inside the nut 3, the shaft-side ball screw groove 14 and the nut-side ball screw groove 16 are arranged so as to face each other in the radial direction to form the spiral-shaped load path 10. The number of threads of the nut-side ball screw groove 16, similar to the shaft-side ball screw groove 14, is one. The cross-sectional groove shape of the nut-side ball screw groove 16, similar to that of the shaft-side ball screw groove 14, may also be a gothic arch groove or a circular arc groove.

The circulation groove 11 has a substantially S-shape and is formed on the inner peripheral surface of the nut 3 by forging (cold forging), for example. The circulation groove 11 smoothly connects axially adjacent portions of the nut-side ball screw groove 16, and connects the start point and the end point of the load path 10. Therefore, the balls 4 that have reached the end point of the load path 10 are returned to the start point of the load path 10 through the circulation groove 11. Note that the start point and end point of the load path 10 are interchanged according to the direction of relative displacement in the axial direction (relative rotation direction) of the screw shaft 2 and the nut 3.

The circulation groove 11 has a substantially semicircular cross-sectional shape. The circulation groove 11 has a groove width slightly larger than a diameter of the balls 4, and has a groove depth that allows the balls 4 moving in the circulation groove 11 to ride over the thread of the shaft-side ball screw groove 14. In this example, the inner peripheral surface of the nut 3 is provided with four circulation grooves 11 uniformly spaced in the circumferential direction (at equal intervals of 90 degrees). Therefore, the ball screw device 1 of this example includes four circuits. Note that, in the ball screw device 1 of the present example, the circulation groove 11 is formed directly on the inner peripheral surface of the nut 3; however, the circulation grooves may also be formed in a separate circulation component (for example, a segment) separate from the nut and the circulation component can be fixed to the nut.

In this example, the outer peripheral surface of the nut 3 is configured by a stepped cylindrical surface. The nut 3 has a first fitting surface 17 having a cylindrical surface shape to which the piston 5 is externally fitted at an end portion on the other side in the axial direction of the outer peripheral surface, and has a large-diameter surface 18 having a cylindrical surface shape and having an outer diameter larger than that of the first fitting surface 17 in a range extending from an intermediate portion in the axial direction to a portion on the one side in the axial direction of the outer peripheral surface. The large-diameter surface 18 is arranged adjacent to the one side in the axial direction of the first fitting surface 17. In addition, the outer peripheral surface of the nut 3 has a stepped surface 19 having an annular shape between the first fitting surface 17 and the large diameter surface 18 and facing the other side in the axial direction. The stepped surface 19 is a flat surface that exists on a virtual plane perpendicular to a central axis of the nut 3. In this example, the outer diameter of the first fitting surface 17 is constant along the axial direction except for a portion where a first retaining ring groove 20 is formed. In addition, the maximum outer diameter of the nut 3 becomes the outer diameter of the large-diameter surface 18.

The ball screw device 1 of the present example utilizes the retaining ring 6 to prevent relative displacement in the axial direction (back up) of the nut 3 and the piston 5. For this reason, the first retaining ring groove 20 for locking an inner diameter side portion of the retaining ring 6 is provided over the entire circumference at an intermediate portion in the axial direction of the first fitting surface 17. The first retaining ring groove 20 is formed by machining such as cutting, with the stepped surface 19 provided on the outer peripheral surface of the nut 3 as a reference. The first retaining ring groove 20 has a rectangular cross-sectional shape, and is provided in a portion separated toward the other side in the axial direction from the nut-side ball screw groove 16. A depth in the radial direction of the first retaining ring groove 20 is equal to or slightly larger than a width in the radial direction of the retaining ring 6. In addition, a width in the axial direction of the first retaining ring groove 20 is slightly larger than a thickness in the axial direction of the retaining ring 6.

An end surface 3x on the other side in the axial direction of the nut 3 and the first fitting surface 17 are connected through a first chamfered portion 21 having a tapered shape. The end surface 3x on the other side in the axial direction of the nut 3 is a flat surface existing on a virtual plane perpendicular to the central axis of the nut 3.

The ball screw device 1 of the present example uses the nut 3 as a linear motion element. Therefore, in order to prevent the rotation of the nut 3, the outer peripheral surface of the nut 3 has a holding recessed portion 22 for holding the rotation-locking member 8. Holding recessed portions 22 are provided at a plurality of circumferential locations (two locations in this example) on the outer peripheral surface of the nut 3. The holding recessed portions 22 are provided on the other side in the axial direction of the large-diameter surface 18 of the outer peripheral surface of the nut 3.

The holding recessed portion 22 is configured by a recessed groove extending in the axial direction. The holding recessed portion 22 has a blocking surface 23 facing the other side in the axial direction at an end portion on the one side in the axial direction. An end portion on the other side in the axial direction of the holding recessed portion 22 opens to the stepped surface 19. Therefore, the holding recessed portion 22 is open to both the outer peripheral surface and the stepped surface 19 of the nut 3. A central axis of the holding recessed portion 22 is arranged parallel to the central axis of the nut 3. A dimension in the axial direction from the stepped surface 19 to the blocking surface 23 is slightly larger than a dimension in the axial direction of the rotation-locking member 8. The blocking surface 23 is a flat surface that exists on a virtual plane perpendicular to the central axis of the nut 3, and has a partially circular shape (substantially semicircular shape) when viewed in the axial direction.

Figure 6:
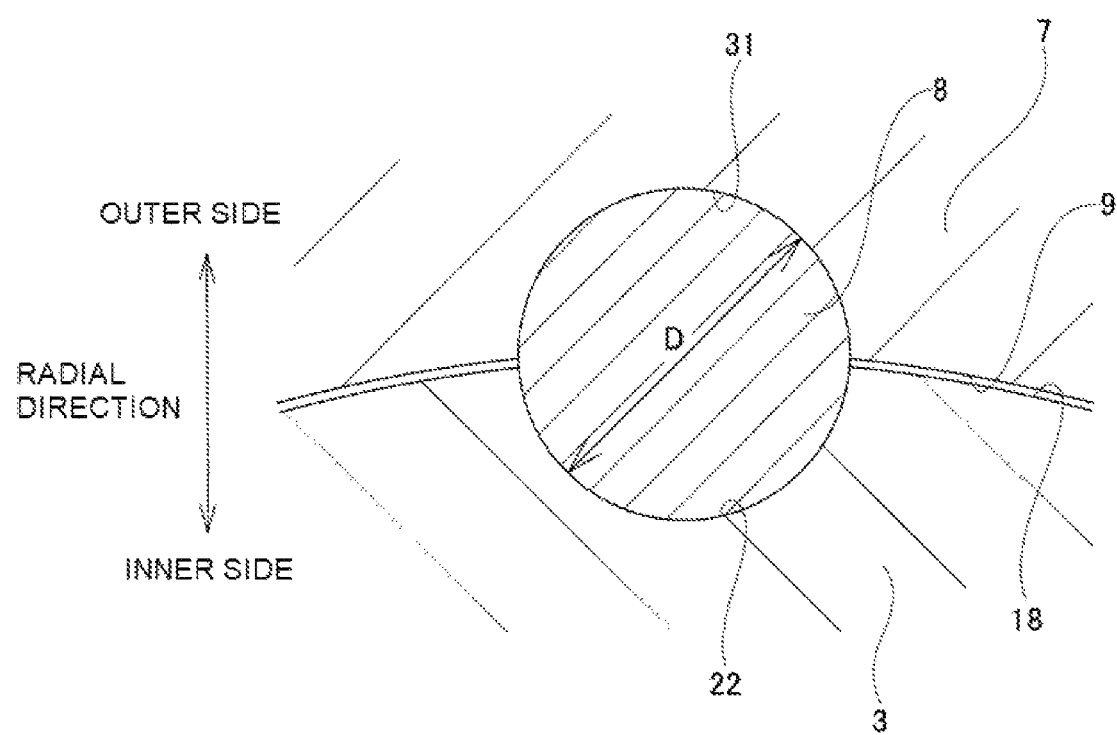
FIG. 6 is a cross-sectional view taken along line A-A of FIG. 1.
Figure 7:
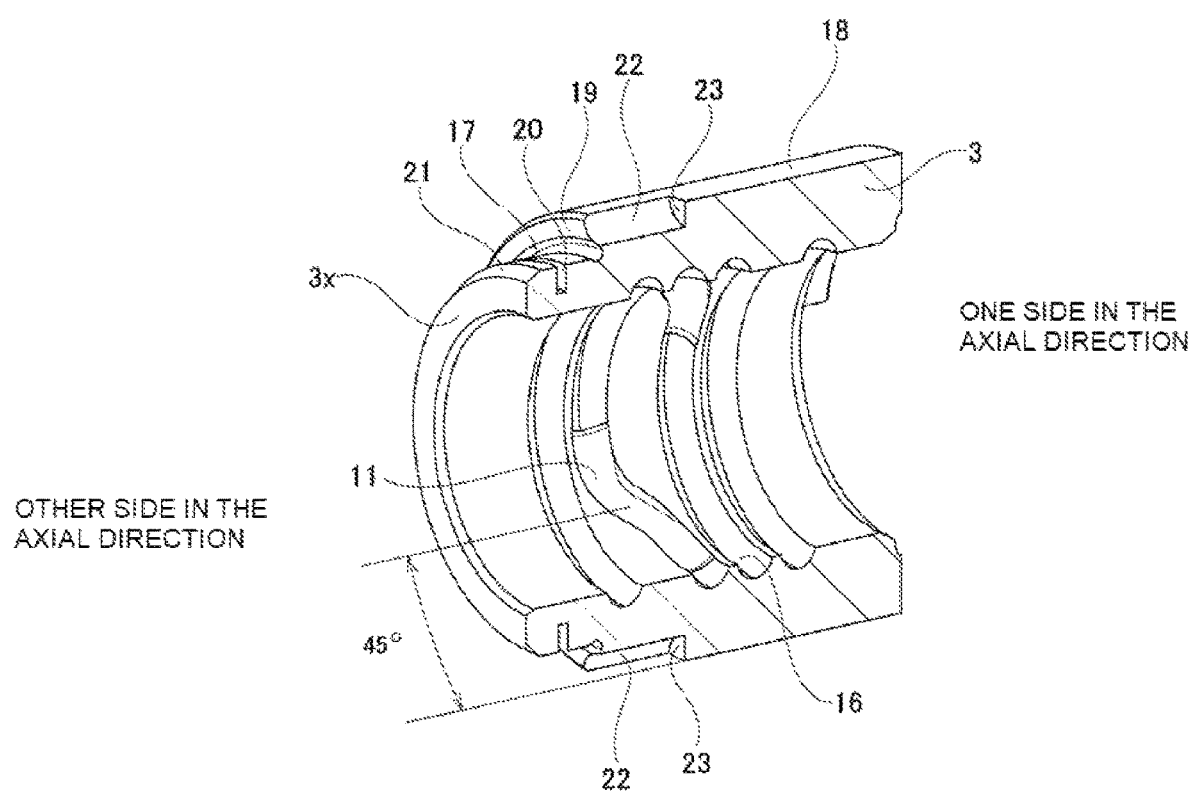
FIG. 7 is a cross-sectional perspective view of a nut of the ball screw device of the first example.

The holding recessed portion 22 has a cross-sectional shape that is capable of engaging with regard to the circumferential direction with a portion on an inner side in the radial direction of the rotation-locking member 8. In the present example, as will be described later, the rotation-locking member 8 is configured in a cylindrical shape, and thus as illustrated in FIG. 6, the cross-sectional shape of the holding recessed portion 22 with respect to the imaginary plane perpendicular to the central axis of the nut 3 is an arc shape. However, the shapes of the rotation-locking member 8 and the holding recessed portion 22 are arbitrary as long as they are capable of engaging in the circumferential direction with a portion on the inner side in the radial direction of the rotation-locking member 8. For example, the cross-sectional shape of the holding recessed portion may be rectangular. In such a case, the rotation-locking member 8 may have a columnar shape or a prismatic shape. Furthermore, it is also possible to combine a holding recessed portion having an arcuate cross-sectional shape and the rotation-locking member 8 having a prismatic shape.

In the present example, the holding recessed portion 22 has a radius of curvature equal to or slightly larger than half a diameter D of the rotation-locking member 8. An opening width in the circumferential direction of the holding recessed portion 22 on the outer peripheral surface of the nut 3 is substantially the same as the diameter D of the rotation-locking member 8. In addition, a diameter of an inscribed circle passing through a portion of the holding recessed portion 22 where the depth in the radial direction is the largest is equal to or larger than the outer diameter of the first fitting surface 17. However, the sizes of the rotation-locking member 8 and the holding recessed portion 22 can be arbitrarily set according to their respective shapes as long as they are able to engage in the circumferential direction with the portion on the inner side in the radial direction of the rotation-locking member 8.

Holding recessed portions 22 are arranged on the outer peripheral surface of the nut 3 at uniform intervals in the circumferential direction. In the present example, two holding recessed portions 22 are provided, and the two holding recessed portions 22 are arranged at positions 180 degrees out of phase with each other. In addition, the holding recessed portions 22 are arranged at positions with a position (phase) shift in the circumferential direction from all the circulation grooves 11 provided on the inner peripheral surface of the nut 3.

Figure 8:
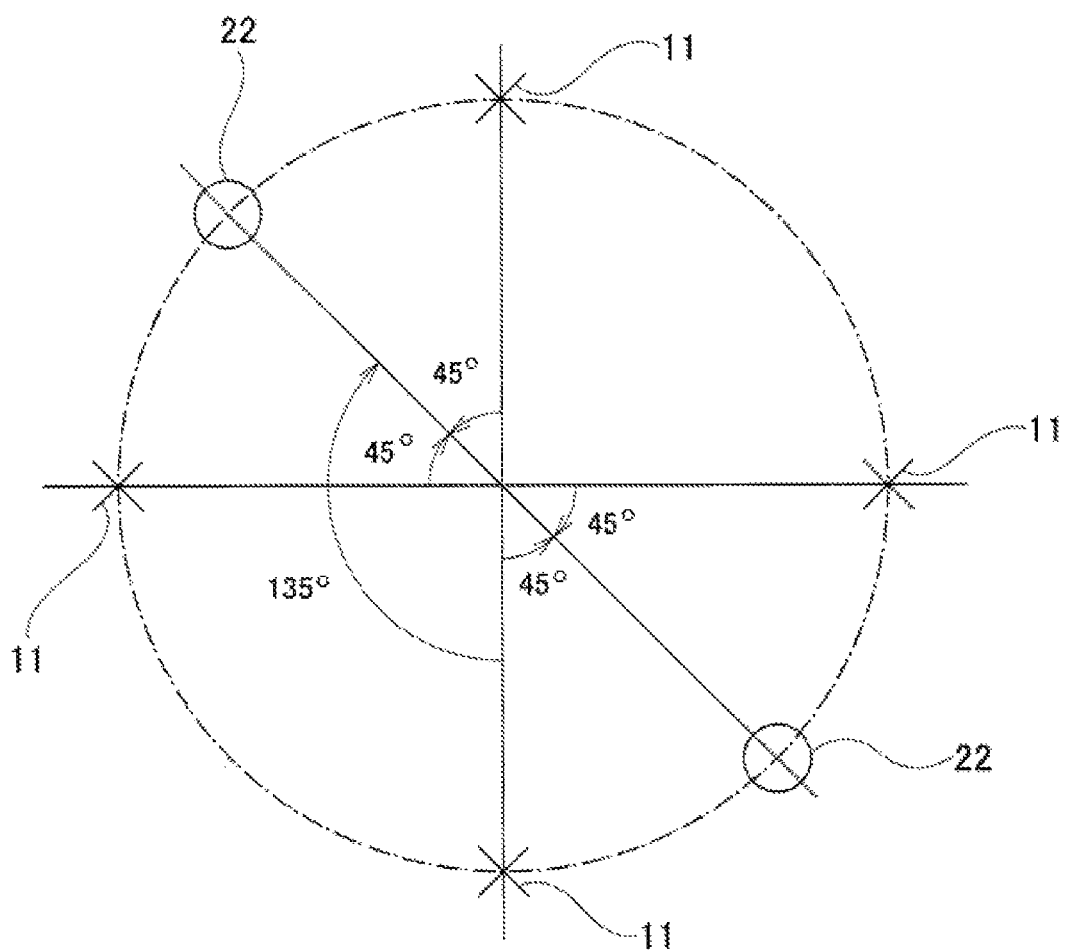
FIG. 8 is a schematic diagram for explaining a positional relationship in a circumferential direction between a circulation groove and a holding recessed portion in the ball screw device of the first example.
Figure 9:
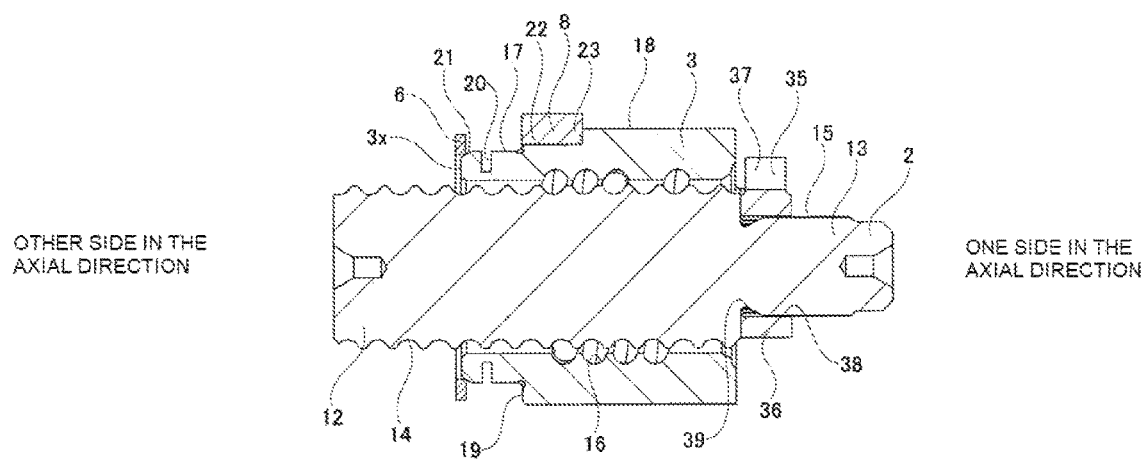
FIG. 9A and FIG. 9B are diagrams for explaining an operation of assembling a piston to the nut in the ball screw device of the first example.

More specifically, of the two holding recessed portions 22, one of the holding recessed portions 22 (lower holding recessed portion 22 in FIG. 7) is arranged at a position that is shifted 45 degrees toward one side in the circumferential direction from a central portion of one circulation groove 11 of the circulation grooves 11 provided on the inner peripheral surface of the nut 3 that is formed at the same position in the axial direction as the holding recessed portion 22. In addition, the other of the two holding recessed portions 22 (upper holding recessed portion 22 in FIG. 7) is located at a portion shifted 135 degrees toward the other side in the circumferential direction from a central portion of the one circulation groove 11. Therefore, as illustrated in FIG. 8, in a case where the nut 3 is viewed from the axial direction, the two holding recessed portions 22 indicated by circles are arranged at positions shifted 45 degrees toward opposite sides in the circumferential direction with respect to two circulation grooves 11 indicated by an x and positioned nearby in the circumferential direction. In other words, one of the holding recessed portions 22 is arranged at a central position in the circumferential direction between two of the four circulation grooves 11 that are adjacent to each other in the circumferential direction, and the other holding recessed portion 22 is arranged at a central position in the circumferential direction between the remaining two circulation grooves 11. Note that in a case of adopting a configuration in which a circulation component such as a segment having a circulation groove is fixed to the nut, the holding recessed portions may be arranged at positions shifted in the circumferential direction from the circulation component. Furthermore, in a case where circulation components are provided at a plurality of locations at uniform intervals in the circumferential direction, the holding recessed portions may be positioned at locations shifted by the same angle on opposite sides in the circumferential direction with respect to two circulation components that are near to each other in the circumferential direction. In other words, the holding recessed portions may be arranged at central positions in the circumferential direction between two circulation components that are adjacent in the circumferential direction.

The nut 3 has a non-rotating side engaging portion 24 at an end portion on the one side in the axial direction. The non-rotating side engaging portion 24 is provided at a portion in the circumferential direction of a side surface on the one side in the axial direction of the nut 3, and protrudes toward the one side in the axial direction. The non-rotating side engaging portion 24 has a fan column shape. In the illustrated example, the nut 3 is configured so as to be integrated as a whole including the non-rotating side engaging portion 24; however, the nut 3 may also be configured by coupling and fixing a cylindrical member having a nut-side ball screw groove on an inner peripheral surface thereof and a separately configured non-rotating side engaging portion.

<Balls>

The balls 4 are steel balls having a specified diameter, and are arranged in the load path 10 and the circulation grooves 11 so as to be able to roll. The balls 4 arranged in the load path 10 roll while receiving a compressive load, whereas the balls 4 arranged in the circulation grooves 11 roll while being pushed by the following balls 4 without receiving a compressive load.

<Piston>

The piston 5, which is a fitting cylinder, is made of, for example, metal such as an aluminum-based alloy, and has a bottomed cylindrical shape. The piston 5 is externally fitted and fixed to the nut 3 by press fitting, and undergoes linear motion together with the nut 3. The piston 5 is arranged coaxially with the nut 3 and is fitted in an insertion hole 9 provided in the housing 7 so as to move in the axial direction. The piston 5 has a cylindrical portion 25 and a bottom plate portion 26 that closes an opening on an end portion on the other side in the axial direction of the cylindrical portion 25.

The cylindrical portion 25 has a cylindrical second fitting surface 27 that externally fits onto the nut 3 at an end portion on the one side in the axial direction of the inner peripheral surface. In the present example, the inner diameter of the second fitting surface 27 is constant over the axial direction except for a portion where a second retaining ring groove 29 is formed, and is slightly smaller than the outer diameter of the first fitting surface 17 of the nut 3. Note that, in the present example, even a portion of the inner peripheral surface of the cylindrical portion 25 that is separated to the one side in the axial direction from the second fitting surface 27 has the same inner diameter as the second fitting surface 27. However, in a portion of the inner peripheral surface of the cylindrical portion 25 having the second fitting surface 27, that is, the fitting portion with the first fitting surface 17, as long as the dimension for fitting with the nut 3 is controlled, the inner diameter of the portion of the inner peripheral surface of the cylindrical portion 25 that is separated toward the other side from the fitting portion may be larger or smaller than that of the second fitting portion.

The cylindrical portion 25 includes a small-diameter stepped portion 28 at an end portion on the one side in the axial direction of the outer peripheral surface. The small-diameter stepped portion 28 is arranged on an outer side in the radial direction of the second fitting surface 27 and has an outer diameter that is slightly smaller than that of the portion separated in the axial direction from the small-diameter stepped portion 28. Therefore, the maximum outer diameter of the piston 5 is the outer diameter of the portion of the cylindrical portion 25 that is separated in the axial direction from the small-diameter stepped portion 28, and may be made the same as the maximum outer diameter of the nut 3. Note that making the maximum outer diameter of the piston 5 the same as the maximum outer diameter of the nut 3 is not limited to a case where the maximum outer diameter of the piston 5 is completely matched with the maximum outer diameter of the nut 3, including the case where the maximum outer diameter of the piston 5 is made substantially the same as the maximum outer diameter of the nut 3 within the inevitable manufacturing tolerance range.

The second fitting surface 27 includes, in an axially intermediate portion, the second retaining ring groove 29 for locking a portion on the outer diameter side of the retaining ring 6 over the entire circumference. The second retaining ring groove 29 is formed by machining such as cutting with the end surface 5x on the one side in the axial direction of the piston 5 as a reference. The second retaining ring groove 29 has a rectangular cross-sectional shape, and, in a state in which the piston 5 is externally fixed to the nut 3, is provided in a portion facing the first retaining ring groove 20 in the radial direction. A depth $T_{29}$ in the radial direction of the second retaining ring groove 29 is smaller than a depth in the radial direction of the first retaining ring groove 20 and smaller than a width (maximum value) $T_6$ in the radial direction of the retaining ring 6. However, when the retaining ring 6 can be locked so as to span between the first retaining ring groove 20 and the second retaining ring groove 29, the depth in the radial direction of the second retaining ring groove 29 may also be greater than the width in the radial direction of the retaining ring 6. In addition, a width in the axial direction of the second retaining ring groove 29 is the same as a width in the axial direction of the first retaining ring groove 20. An end surface 5x on the one side in the axial direction of the piston 5 is a flat surface that exists on a virtual plane perpendicular to the central axis of the piston 5.

The end surface 5x on the one side in the axial direction of the piston 5 and the second fitting surface 27 are connected through a second chamfered portion 30 having a tapered surface.

In the present example, an end portion on the one side in the axial direction of the piston 5 is externally fitted and fixed to the end portion on the other side in the axial direction of the nut 3 by press fitting. As a result, the first fitting surface 17 provided on the end portion on the other side in the axial direction of the outer peripheral surface of the nut 3 and the second fitting surface 27 provided on the end portion on the one side in the axial direction of the inner peripheral surface of the piston 5 are brought into contact with interference over the entire length in the axial direction. In addition, in a state in which the piston 5 is externally fitted and fixed to the nut 3, the end surface 5x on the one side in the axial direction of the piston 5 is abutted in the axial direction against the stepped surface 19 provided on the outer peripheral surface of the nut 3.

<Retaining Ring>

The retaining ring 6 is a member for preventing relative displacement in the axial direction between the nut 3 and the piston 5. Note that, in this example, relative displacement in the axial direction between the nut 3 and the piston 5 can be prevented even by externally fitting and fixing the piston 5 to the nut 3 by press-fitting, and thus the retaining ring 6 can function as a backup in a case where the interference between the nut 3 and the piston 5 is reduced.

The retaining ring 6 is made of metal, has a rectangular cross-sectional shape, and is formed in a partially annular shape (substantially C-shaped) as a whole.

The retaining ring 6 is engaged so as to span between the first retaining ring groove 20 of the nut 3 and the second retaining ring groove 29 of the piston 5. More specifically, a portion on the inner diameter side of the retaining ring 6 is engaged with the first retaining ring groove 20, and a portion on an outer diameter side of the retaining ring 6 is engaged with the second retaining ring groove 29.

The outer diameter of the retaining ring 6 in a free state is at least larger than an outer diameter $D_{17}$ of the first fitting surface 17 provided on the outer peripheral surface of the nut 3, and preferably is larger than a groove bottom diameter $D_{29}$ of the second retaining ring groove 29 formed on the inner peripheral surface of the piston 5.

Assembly work of the retaining ring 6 can be performed, for example, as illustrated in FIG. 9A and FIG. 9B.

First, as illustrated in FIG. 9A, by pushing the end portion on the other side in the axial direction of the nut 3 inside the retaining ring 6, the diameter of the retaining ring 6 is elastically expanded by using the first chamfered portion 21, and the retaining ring 6 is locked in the first retaining ring groove 20. Next, as illustrated in FIG. 9B, a second chamfered portion 30 of the piston 5 is used to elastically contract the diameter of the retaining ring 6, which causes the end portion on the other side in the axial direction of the nut 3 to be press-fitted with the end portion on the one side in the axial direction of the piston 5 while being pushed inside the first retaining ring groove 20. Then, in a state in which the end surface 5x on the other side in the axial direction of the piston 5 abuts against the stepped surface 19 of the nut 3 and positions in the axial direction of the first retaining ring groove 20 and the second retaining ring groove 29 are aligned, the retaining ring 6 is elastically restored. As a result, the retaining ring 6 can be locked so as to span between the first retaining ring groove 20 of the nut 3 and the second retaining ring groove 29 of the piston 5. Note that, in the present example, a case in which a retaining ring for a shaft that is firstly engaged with the first retaining ring groove 20 of the nut 3 is used as the retaining ring 6 has been described; however, alternatively, a retaining ring for a hole, which is firstly engaged with the second retaining ring groove 29 of the piston 5 may be used as the retaining ring 6.

<Housing>

The housing 7 has a cylindrical shape with a bottom, and includes an insertion hole 9 having a circular cross-sectional shape. The central axis of the insertion hole 9 is arranged coaxially with the central axis of the screw shaft 2. The insertion hole 9 has an inner diameter through which the nut 3 and the piston 5 can be inserted in the axial direction. More specifically, the insertion hole 9 has an inner diameter slightly larger than the cylindrical portion 25 of the piston 5 and the large diameter surface 18 of the nut 3.

The insertion hole 9 has a guide recessed groove 31 on an inner peripheral surface thereof for allowing the rotation-locking member 8 to slidably engage in the axial direction. Guide recessed grooves 31 are provided at a plurality of locations in the circumferential direction (two locations in this example) on the inner peripheral surface of the insertion hole 9 and extend in the axial direction. In the present example, the guide recessed grooves 31 are provided in a range extending from an end portion on the one side in the axial direction of the insertion hole 9 to an intermediate portion in the axial direction.

The end portions on the one side in the axial direction of the guide recessed grooves 31 are open to the end surface on the one side in the axial direction of the housing 7. Each guide recessed groove 31 has an abutting surface 32 at an end portion on the other side in the axial direction that faces the one side in the axial direction. Therefore, the guide recessed grooves 31 open to the inner peripheral surface of the insertion hole 9 and the end surface on the one side in the axial direction of the housing 7. The central axes of the guide recessed grooves 31 are arranged parallel to the central axis of the insertion hole 9. The dimension in the axial direction of the guide recessed grooves 31 is sufficiently larger than the dimension in the axial direction of the rotation-locking member 8 and is determined according to the stroke required for the nut 3 and the piston 5.

The guide recessed groove 31 has a cross-sectional shape capable of engaging in the circumferential direction with a portion on an outer side in the radial direction of the rotation-locking member 8. In the present example, as will be described later, the rotation-locking member 8 is formed in a columnar shape, and thus, as illustrated in FIG. 6, the cross-sectional shape of the guide recessed groove 31 with respect to an imaginary plane orthogonal to the central axis of the insertion hole 9 is arc shaped. More specifically, the guide recessed groove 31 has a semicircular cross-sectional shape with a central angle of approximately 180 degrees. Therefore, a width in the circumferential direction of the guide recessed groove 31 increases as going inward in the radial direction. The guide recessed groove 31 has a radius of curvature having a size that is substantially the same as that of the holding recessed portion 22 provided on the outer peripheral surface of the nut 3. An opening width in the circumferential direction of the guide recessed groove 31 at the inner peripheral surface of the insertion hole 9 is substantially the same as the diameter D of the rotation-locking member 8. However, the shape of the guide recessed groove 31 is also arbitrary as long as the shape is capable of engaging in the circumferential direction with a portion on the outer side in the radial direction of the rotation-locking member 8. For example, the cross-sectional shape of the guide recessed groove 31 can be rectangular. In addition, the size of the guide recessed groove 31 also depends on the shapes of the guide recessed groove 31 and the rotation-locking member 8 and their shape relationship and may be arbitrarily set as long as the size is capable of engaging in the circumferential direction with a portion on the outer side in the radial direction of the rotation-locking member 8.

The guide recessed grooves 31 are arranged on the inner peripheral surface of the insertion hole 9 at uniform intervals in the circumferential direction. In the present example, two guide recessed grooves 31 are provided, and thus the two guide recessed grooves 31 are arranged at positions that are 180 degrees out of phase. In addition, in an assembled state of the ball screw device 1, the guide recessed grooves 31 are arranged at the same positions in the circumferential direction as the holding recessed portions 22. Therefore, the guide recessed grooves 31 and the holding recessed portions 22 are arranged to face each other in the radial direction.

A plurality (two in the illustrated example) of seal recessed grooves 33a and 33b are provided at portions of the inner peripheral surface of the insertion hole 9 located further on the other side in the axial direction than the guide recessed grooves 31. The seal recessed grooves 33a and 33b have an annular shape. O-rings 34a and 34b for sealing between the inner peripheral surface of the insertion hole 9 and the outer peripheral surface of the piston 5 are mounted in the seal recessed grooves 33a and 33b, respectively.

In the present example, the housing 7 is configured in a cylindrical shape with a bottom; however, the shape of the housing is arbitrary, and the shape can be changed as appropriate. In addition, in the present example, the housing 7 is configured to include only the insertion hole (cylinder hole) 9 in the inner portion thereof; however, in addition to the cylinder hole, the housing 7 may be provided with a motor accommodating portion for accommodating a motor, a gear accommodating portion for accommodating a gear, and the like.

<Rotation-Locking Member>

The rotation-locking member 8 is a member for preventing the nut 3 from relatively rotating with regard to the housing 7, and is made of metal and has a cylindrical column shape.

The rotation-locking member 8, in a state in which the central axis is arranged parallel to the central axis of the insertion hole 9, is arranged so as to be sandwiched in the radial direction between the holding recessed portion 22 provided on the outer peripheral surface of the nut 3 and the guide recessed groove 31 provided on the inner peripheral surface of the insertion hole 9. In other words, the rotation-locking member 8 is arranged to span between the holding recessed portion 22 and the guide recessed groove 31.

Figure 5:
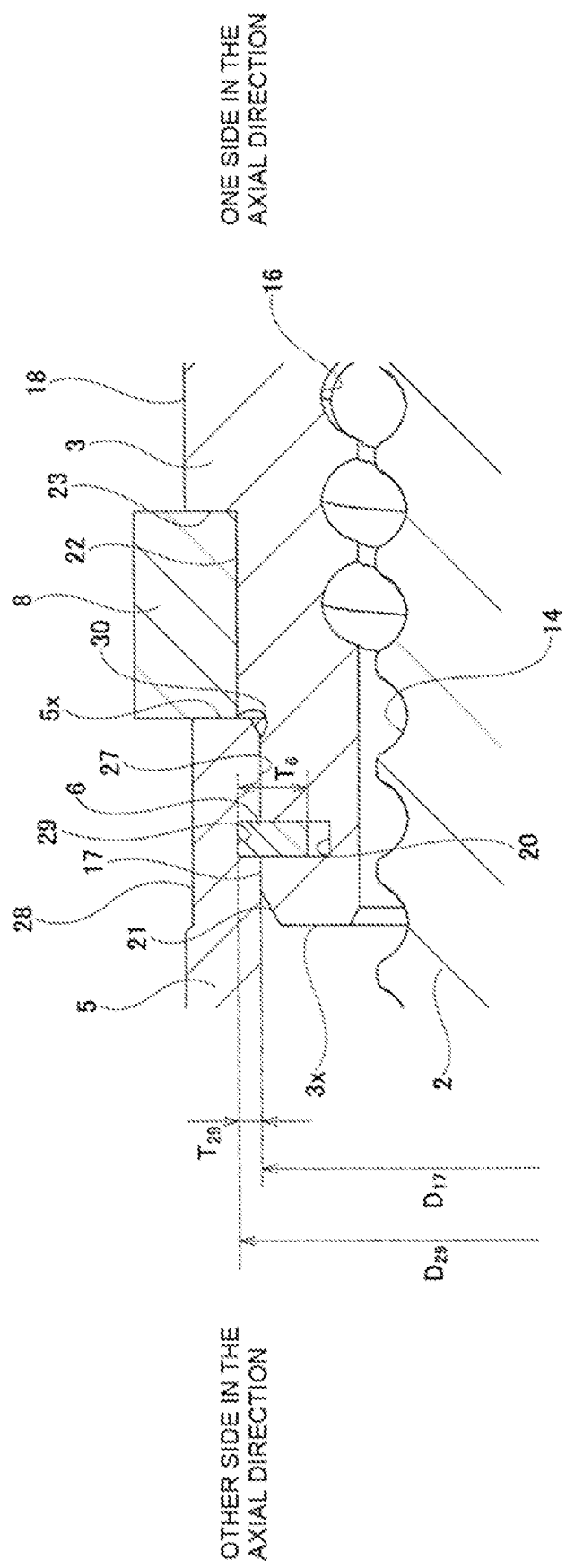
FIG. 5 is a partial enlarged view of FIG. 4.

A portion on an inner side in the radial direction (lower portion in FIG. 6) of the rotation-locking member 8 is arranged inside the holding recessed portion 22. In addition, the portion on the inner side in the radial direction of the rotation-locking member 8, as illustrated in FIG. 5, is sandwiched in the axial direction between the blocking surface 23 of the holding recessed portion 22 and the end surface 5x on the one side in the axial direction of the piston 5. In other words, an end surface on the one side in the axial direction of the rotation-locking member 8 faces the blocking surface 23 in the axial direction, and the end surface of the rotation-locking member 8 on the other side in the axial direction faces the end surface 5x on the one side in the axial direction of the piston 5 in the axial direction. Therefore, the rotation-locking member 8 is prevented from falling out in the axial direction by the blocking surface 23 and the end surface 5x on the one side in the axial direction of the piston 5. Therefore, the portion on the inner side in the radial direction of the rotation-locking member 8 is arranged inside the holding recessed portion 22 so as not to move in the axial direction.

In the present example, a dimension in the axial direction of the rotation-locking member 8 is set slightly smaller than a dimension in the axial direction from the stepped surface 19 of the nut 3 to the blocking surface 23 of the holding recessed portion 22. Therefore, in a state in which the piston 5 is externally fitted and fixed to the nut 3, the dimension in the axial direction of the rotation-locking member 8 is slightly smaller than the distance in the axial direction from the end surface 5x on the one side of the piston 5 that is abutted against the stepped surface 19 to the blocking surface 23. Therefore, a gap is formed between the end surface on the one side in the axial direction of the rotation-locking member 8 and the blocking surface 23, and/or between the end surface on the other side in the axial direction of the rotation-locking member 8 and the end surface 5x on the one side in the axial direction of the piston 5. In other words, the end surfaces on both sides in the axial direction of the rotation-locking member 8 do not simultaneously come in contact with the blocking surface 23 and the end surface 5x on the one side in the axial direction of the piston 5 which face them in the axial direction.

A portion on an outer side in the radial direction (upper portion in FIG. 6) of the rotation-locking member 8 is arranged inside the guide recessed groove 31. As illustrated in FIG. 1, the dimension in the axial direction of the guide recessed groove 31 is set sufficiently larger than the dimension in the axial direction of the rotation-locking member 8, and the portion on the outer side in the radial direction of the rotation-locking member 8 is arranged inside the guide recessed groove 31 so as to be slide in the axial direction.

When assembling the ball screw device 1, the rotation-locking member 8 coated with grease is arranged inside the holding recessed portion 22, and by attaching the rotation-locking member 8 to the holding recessed portion 22, it is possible to prevent the rotation-locking member 8 from falling out. Alternatively or additionally, by arranging a guide tube so as to cover around the rotation-locking member 8 arranged inside the holding recessed portion 22, it is possible to prevent the rotation-locking member 8 from falling out.

The ball screw device 1 of the present example includes a stopper 35 for restricting a stroke end of the nut 3.

<Stopper>

The stopper 35 has a boss portion 36 having an annular shape and a rotation-side engaging portion (claw portion) 37 having a projection shape.

The boss portion 36 is externally fitted on the fitting shaft portion 13 of the screw shaft 2 so as not to be able to relatively rotate with regard to the fitting shaft portion 13. The boss portion 36 has an engaging hole 38 in a central portion in the radial direction through which the fitting shaft portion 13 can be inserted in the axial direction. In the present example, the engaging hole 38 is configured by a spline hole having female spline teeth 39 formed on an inner peripheral surface thereof. By spline engagement between the female spline teeth 39 formed on the inner peripheral surface of the engaging hole 38 and the male spline teeth 15 formed on the outer peripheral surface of the fitting shaft portion 13, the boss portion 36 is externally fitted to the fitting shaft portion 13 so as not to relatively rotate.

The boss portion 36 has a cylindrical outer peripheral surface. The rotation-side engaging portion 37 is provided at a portion in the circumferential direction of the outer peripheral surface of the boss portion 36, and protrudes outward in the radial direction.

The ball screw device 1 of the present example includes a driving member 40 for rotationally driving the screw shaft 2.

<Driving Member>

The driving member 40 is configured by a member such as a gear or a pulley, and rotates and drives the screw shaft 2 by transmitting torque input from a drive source such as an electric motor to the screw shaft 2. The driving member 40 is arranged adjacent to the one side in the axial direction of the stopper 35.

The driving member 40 has a substrate portion 41, a tube portion 42 having a cylindrical shape, and a torque input portion 43.

The substrate portion 41 has a circular flat plate shape, and has an installation hole 44 that penetrates in the axial direction at a center portion in the radial direction. Female spline teeth 45 are formed on an inner peripheral surface of the installation hole 44. By engaging the female spline teeth 45 formed on the inner peripheral surface of the installation hole 44 with a spline engagement with the male spline teeth 15 formed on a portion of the fitting shaft portion 13 that is separated to the one side in the axial direction from the portion where the stopper 35 is externally fitted, the substrate portion 41 is externally fitted to the fitting shaft portion 13 so as not to relatively rotate. Note that, in a case where the fitting shaft portion 13 has male serrations, female serrations are formed on the inner peripheral surface of the installation hole 44, and the male serrations and the female serrations are engaged with each other.

The cylindrical portion 42 is provided at a portion on an outer side in the radial direction of the driving member 40. An end portion on the one side in the axial direction of the tube portion 42 is connected to a portion on an outer side in the radial direction of the substrate portion 41. The tube portion 42 has an inner diameter slightly larger than the outer diameter of the nut 3. The tube portion 42 covers the periphery of an end portion on the one side in the axial direction of the screw portion 12.

The torque input portion 43 is provided on the outer peripheral surface of the driving member 40. In the present example, the torque input portion 43 is provided on the outer peripheral surface of the tube portion 42. Therefore, the torque input portion 43 is arranged at a position overlapping the screw portion 12 with regard to the radial direction.

The torque input portion 43, in a case where a gear is used as the driving member 40, becomes a gear portion, in a case where a pulley is used as the driving member 40, becomes a belt receiving surface over which a belt is passed, and in a case where a sprocket is used as the driving member 40, becomes a tooth portion over which a chain is passed. In either case, torque from the drive source is input to the torque input portion 43. Alternatively, a motor output shaft may be used as the driving member 40. In this case, the torque input portion 43 is configured by the output shaft itself, a spline hole formed with female spline teeth 39 for spline engagement with the male spline teeth of the fitting shaft portion 13 is provided at a tip end portion of the output shaft, or a serration hole having female serrations that engage with the male serrations of the fitting shaft portion 13 is provided at the tip end portion of the output shaft.

<Explanation of Operation of Ball Screw Device>

In the ball screw device 1 of the present example, when the screw shaft 2 is rotated and driven by the drive source (not illustrated) through the driving member 40, the retaining ring 6 prevents relative displacement in the axial direction with respect to the piston 5, and the nut 3, the relative rotation with respect to the housing 7 of which is prevented by the rotation-locking member 8, undergoes linear motion inside the insertion hole 9 together with the piston 5. As a result, liquid or gas filled inside the insertion hole (cylinder hole) 9 is discharged or sucked through a communication hole (not illustrated) provided in the housing 7. When the nut 3 and the piston 5 undergo linear motion, the rotation-locking member 8 is pressed in the axial direction by the blocking surface 23 of the holding recessed portion 22 or by the end surface 5x on the one side in the axial direction of the piston 5, and undergoes linear motion together with the nut 3 and piston 5.

In the present example, when the nut 3 is relatively moved to the other side in the axial direction with respect to the screw shaft 2 and the piston 5 is advanced, an axial force (axial load) is transmitted between the nut 3 and the piston 5 through an abutting portion between the stepped surface 19 of the nut 3 and the end surface 5x on the one side in the axial direction of the piston 5. On the other hand, when the nut 3 is relatively moved to the one side in the axial direction with respect to the screw shaft 2 and the piston 5 is moved backward, in a structure as in the present example in which the end portion on the one side in the axial direction of the piston 5 is fitted and fixed to the end portion on the other side in the axial direction of the nut 3 by press fitting, an axial force is transmitted between the nut 3 and the piston 5 at the fitting portion by press fitting; however, power is transmitted between the nut 3 and the piston 5 through the retaining ring 6 in a case where the interference at the fitting portion is reduced due to thermal expansion of the piston 5 or the like. Note that, in a case in which, for example, brake fluid is sealed in the insertion hole 9 of the housing 7, and the piston 5 constantly receives a load from the other side in the axial direction due to the pressure generated by the brake fluid, an axial force may also be transmitted through the abutting portion between the end surface 5x on the one side in the axial direction of the piston 5 and the stepped surface 19 of the nut 3, regardless of the moving direction of the nut 3.

When the nut 3 relatively moves to the one side in the axial direction with regard to the screw shaft 2 and reaches the stroke end, the non-rotating side engaging portion 24 provided on the nut 3 and the rotating side engaging portion 37 provided on the stopper engage. As a result, the screw shaft 2 is prevented from rotating. In this way, in the ball screw device 1 of the present example, the stopper 35 is able to restrict the stroke end related to the relative movement to the one side in the axial direction of the nut 3 with respect to the screw shaft 2. Note that the stroke end related to the relative movement to the other side in the axial direction of the nut 3 with respect to the screw shaft 2 could also be restricted by abutting the end surface on the other side in the axial direction of the rotation-locking member 8 against the abutting surface 32 that is a blocking end of the guide recessed groove 31, or could also be restricted using various conventionally known stroke restricting mechanisms.

With the ball screw device 1 of the present example, it is possible to effectively prevent the relative displacement in the axial direction between the nut 3 and the piston 5 without increasing the manufacturing cost, and it is possible to reduce the size of the entire device and increase the load capacity.

Figure 23:
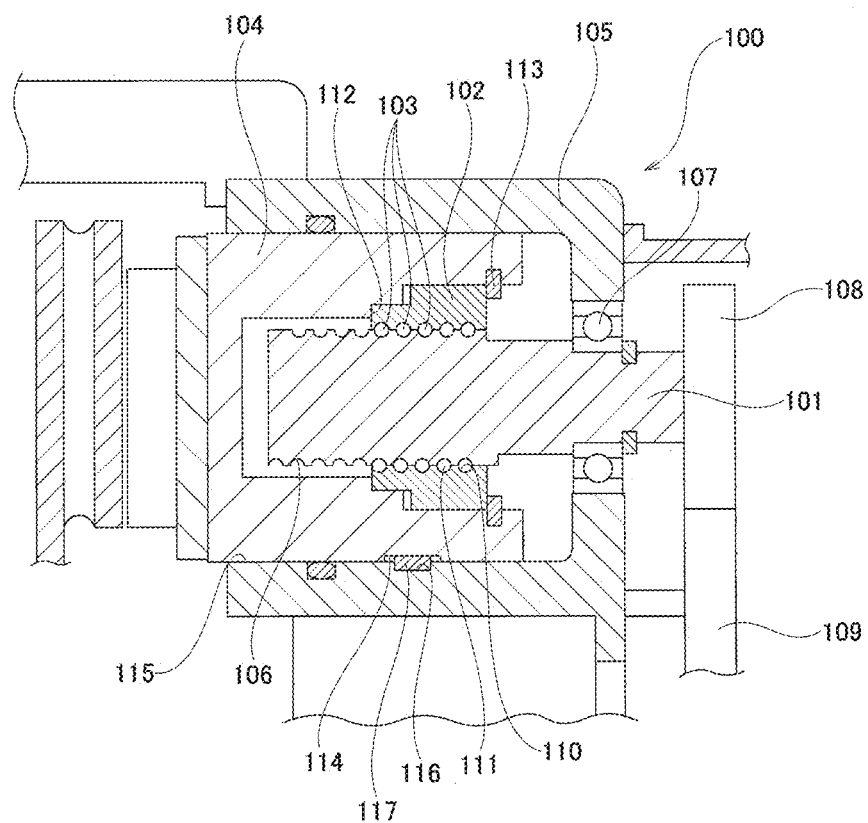
FIG. 23 is a cross-sectional view illustrating a conventional ball screw device.

In other words, in the present example, unlike the conventional ball screw device 100 (see FIG. 23) described in JP 2016-035322 A, the piston 5 is not externally fitted to the nut 3 so as to cover the entire nut 3, but the end portion on the one side in the axial direction of the piston 5 is externally fitted to the end portion on the other side in the axial direction of the nut 3. Therefore, the inner diameter of the piston 5 does not have to be larger than the maximum outer diameter of the nut 3. Accordingly, it is possible to reduce the dimension in the radial direction of the ball screw device 1 as compared with the ball screw device 100 having the conventional structure, and thereby the ball screw device 1 can be made more compact.

In addition, the outer diameter of the large-diameter surface 18 of the nut 3 to which the piston 5 is not externally fitted can be increased without being restricted by the inner diameter of the piston 5. That is, it is possible to maximize the large diameter surface 18 of the nut 3 with respect to the inner diameter of the insertion hole 9 into which the piston 5 can be inserted. Therefore, the load capacity of the ball screw device 1 can be increased.

In the present example, not only is the end portion on the one side in the axial direction of the piston 5 externally fitted to the end portion on the other side in the axial direction of the nut 3 by press fitting, but also the retaining ring 6 is locked spanning between the first retaining ring groove 20 provided in the first fitting surface 17 of the nut 3 and the second retaining ring groove 29 provided in the second fitting surface 27 of the piston 5. Therefore, by the nut 3 being made of an iron-based alloy and the piston 5 being made of an aluminum-based alloy, the retaining ring 6 can effectively prevent displacement in the axial of the nut 3 and the piston 5 even in a case where the interference between the first fitting surface 17 and the second fitting surface 27 decreases due to the difference in thermal expansion coefficient between the nut 3 and the piston 5. Accordingly, with the ball screw device 1 of the present example, displacement in the axial direction between the nut 3 and the piston 5 can be effectively prevented without increasing manufacturing costs.

The end portion on the one side in the axial direction of the piston 5 is externally fitted by press fitting to the end portion on the other side in the axial direction of the nut 3, and thus the piston 5 can be prevented from looseness with respect to the nut 3. In particular, when changing (reversing) the direction of movement of the nut 3 in the axial direction with respect to the screw shaft 2, the piston 5 can be prevented from looseness with respect to the nut 3, and generation of abnormal noise can be suppressed.

The end surface 3x on the other side in the axial direction of the nut 3 and the first fitting surface 17 are connected through the tapered first chamfered portion 21, and thus when locking the retaining ring 6 in the first retaining ring groove 20, the diameter of the retaining ring 6 can be elastically expanded by using the first chamfered portion 21. Therefore, it is possible to improve the assembly workability of the retaining ring 6. Furthermore, the end surface 5x on the one side in the axial direction of the piston 5 and the second fitting surface 27 are connected through the tapered second chamfered portion 30, and thus the end portion on the other side in the axial direction of the nut 3 can be press-fitted with the end portion on the one side in the axial direction of the piston 5 while pushing the retaining ring 6 into the first retaining ring groove 20 using the second chamfered portion 30. Therefore, from this aspect as well, the assembly workability of the retaining ring 6 can be improved.

The maximum outer diameter of the nut 3 (outer diameter of the large diameter surface 18) and the maximum outer diameter of the piston 5 (outer diameter of the cylindrical portion 25) are the same, and thus the nut 3 can be regarded as part of the piston 5. In other words, it can be considered that the full length of the piston 5 is lengthened by the length of the nut 3. Accordingly, inclination (looseness) of the piston 5 with respect to the insertion hole 9 can be suppressed.

The small-diameter stepped portion 28 is provided at the end portion on the one side in the axial direction of the outer peripheral surface of the piston 5, and thus even in a case where the diameter of the small-diameter stepped portion 28 is expanded by press fitting the second fitting surface 27 with the first fitting surface 17 and/or by forming the second retaining ring groove 29 in the second fitting surface 27, it is possible to effectively prevent the small-diameter stepped portion 28, the roundness of which has decreased due to diameter expansion, from coming into contact with the inner peripheral surface of the insertion hole 9.

The first retaining ring groove 20 is formed in a portion separated to the other side in the axial direction from the nut-side ball screw groove 16, and thus by forming the first retaining ring groove 20, it is possible to prevent the strength of the nut 3 from decreasing.

The first retaining ring groove 20 is formed based on the stepped surface 19 that is used as an abutting surface, and the second retaining ring groove 29 is formed based on the end surface 5x on the one side in the axial direction of the piston 5 that is used as an abutting surface. Therefore, when the end surface 5x on the one side in the axial direction of the piston 5 abuts against the stepped surface 19 of the nut 3 during assembly work of the ball screw device 1, the positions in the axial direction of the first retaining ring groove 20 and the second retaining ring groove 29 can be precisely matched (precisely opposed in the radial direction).

In the present example, the portion on the inner side in the radial direction of the rotation-locking member 8 arranged inside the holding recessed portion 22 is sandwiched in the axial direction between the blocking surface 23 of the holding recessed portion 22 and the end surface 5x on the one side in the axial direction of the piston 5, whereby the rotation-locking member 8 can be prevented from coming out in the axial direction. Therefore, in the ball screw device 1 of the present example, the rotation-locking member 8 is prevented from coming out, and thus retaining members such as retaining rings and screw members may be omitted. In addition, in the present example, the rotation-locking member 8, which is separate from the nut 3 and housing 7, is used, and thus it is possible to sufficiently reduce manufacturing costs compared to a case, for example, where a key is integrally molded on the inner peripheral surface of the housing. In addition, the precision of the shape of the rotation-locking member 8 can be improved at low cost. Accordingly, with the ball screw device 1 of the present example, preventing rotation of the nut 3 can be achieved with a small number of parts, and the manufacturing cost can be reduced.

In the present example, the dimension in the axial direction of the rotation-locking member 8 is slightly smaller than the distance in the axial direction from the end surface 5x on the one side in the axial direction of the piston 5 abutted against the stepped surface 19 of the nut 3 to the blocking surface 23 of the holding recessed portion 22, and a gap is formed between the end surface on the one side in the axial direction of the rotation-locking member 8 and the blocking surface 23 and/or between the end surface on the other side in the axial direction of the rotation-locking member 8 and the end surface 5x on the one side in the axial direction of the piston 5. Therefore, the axial force transmitted between the nut 3 and the piston 5 can be prevented from being transmitted through the rotation-locking member 8. In the present example, the axial force can be transmitted through the abutting portion between the end surface 5x on the one side in the axial direction of the piston 5 and the stepped surface 19 of the nut 3. Accordingly, it becomes easier to ensure coaxiality between the nut 3 and the piston 5, and prevent the rotation-locking member 8 from being deformed.

In addition, the holding recessed portions 22 are arranged at positions shifted in the circumferential direction from all the circulation grooves 11 provided on the inner peripheral surface of the nut 3. More specifically, when viewing the nut 3 in the axial direction, two holding recessed portions 22 are arranged at positions shifted by the same angles (45 degrees in the illustrated example) toward opposite sides in the circumferential direction with respect to two circulation grooves 11 located at positions close to each other in the circumferential direction. Therefore, it is possible to suppress a decrease in the strength of the nut 3 due to the formation of the holding recessed portions 22. Accordingly, the outer diameter of the nut 3 does not have to be unnecessarily increased, and the ball screw device 1 can be prevented from becoming large.

In the present example, the end portion on the one side in the axial direction of the piston 5 is externally fitted and fixed by press fitting to the end portion on the other end in the axial direction of the nut 3; however, alternatively, the end portion on the one side in the axial direction of the piston 5 can be externally fitted and fixed by a clearance fit to the end portion on the other side in the axial direction of the nut 3.

In the present example, the cross-sectional shape of the retaining ring 6 is rectangular; however, alternatively, the cross-sectional shape of the retaining ring 6 may be circular. In such a case, the cross-sectional shape of each of the first retaining ring groove 20 and the second retaining ring groove 29 may be semicircular or rectangular.

In the present example, the dimension in the axial direction of the rotation-locking member 8 is slightly smaller than the distance in the axial direction from the stepped surface 19 of the nut 3 to the blocking surface 23 of the holding recessed portion 22; however, alternatively, the dimension in the axial direction of the rotation-locking member 8 may be slightly larger than the distance in the axial direction from the stepped surface 19 of the nut 3 to the blocking surface 23 of the holding recessed portion 22. In such a case, the axial force can be transmitted through the abutting portion between the end surface 5*x* on the one side in the axial direction of the piston 5 and the end surface on the other side in the axial direction of the rotation-locking member 8.

Second Example

Figure 10:
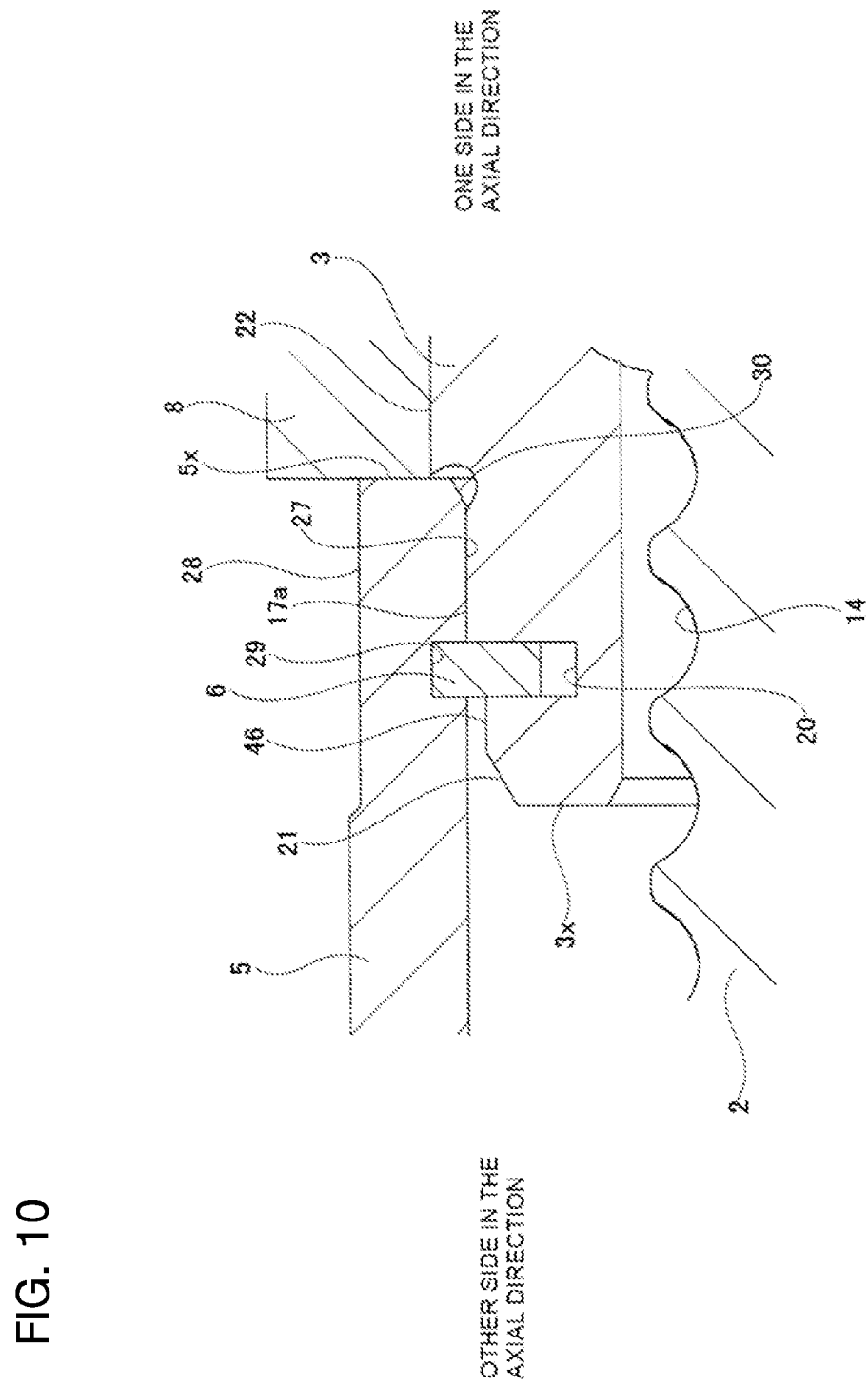
FIG. 10 is a diagram corresponding to FIG. 5 of a ball screw device of a second example of an embodiment according to the present disclosure.

A second example of an embodiment according to the present disclosure will be described with reference to FIG. 10.

In the present example, a first fitting surface 17*a* provided at an end portion on the other side in the axial direction of an outer peripheral surface of the nut 3 is formed into a stepped shape. The first fitting surface 17*a* has a small-diameter portion 46 provided on the other side in the axial direction of the first retaining ring groove 20, the small-diameter portion 45 having a smaller outer diameter than a portion located on the opposite side across the first retaining ring groove 20.

Therefore, in a state in which an end portion on the one side in the axial direction of the piston 5 is externally fitted and fixed by press fitting to an end portion on the other side in the axial direction of the nut 3, the first fitting surface 17*a* and the second fitting surface 27 are brought into contact with each other with interference in part in the axial direction. More specifically, of the first fitting surface 17*a*, only a portion located further on the one side in the axial direction than the first retaining ring groove 20 is brought into contact with the second fitting surface 27 with interference.

In the present example, the small-diameter portion 46 is provided at the portion of the first fitting surface 17*a* further on the other side in the axial direction than the first retaining ring groove 20, and thus the expansion amount of the diameter of the retaining ring 6 when locking the retaining ring 6 in the first retaining ring groove 20 can be reduced compared to that in the first example. Therefore, the assembly work of the ball screw device 1 can be facilitated.

Other configurations and effects of the second example are the same as those of the first example.

Third Example

Figure 11:
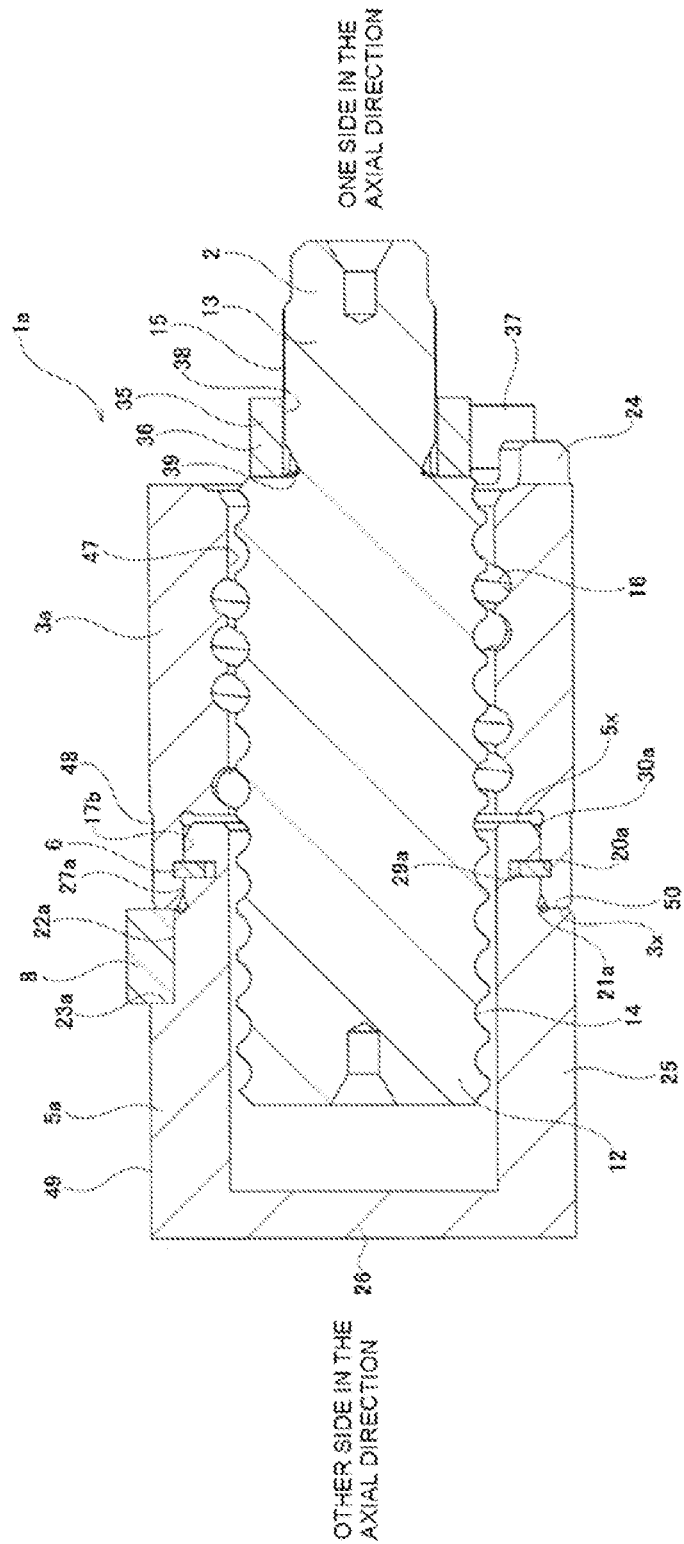
FIG. 11 is a cross-sectional view corresponding to FIG. 4 of a ball screw device of a third example of an embodiment according to the present disclosure.
Figure 12:
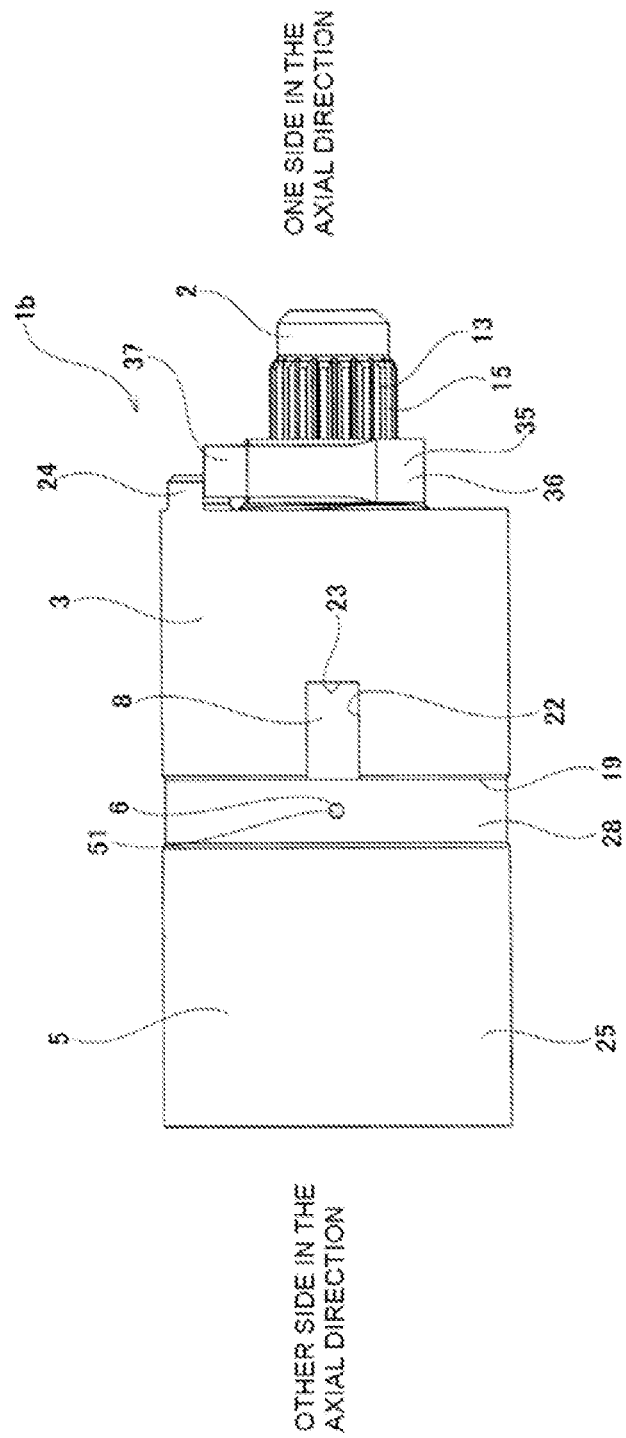
FIG. 12 is a plan view of a ball screw device of a fourth example of an embodiment according to the present disclosure, omitting the housing and the drive member, viewed from outside in the radial direction.
Figure 13:
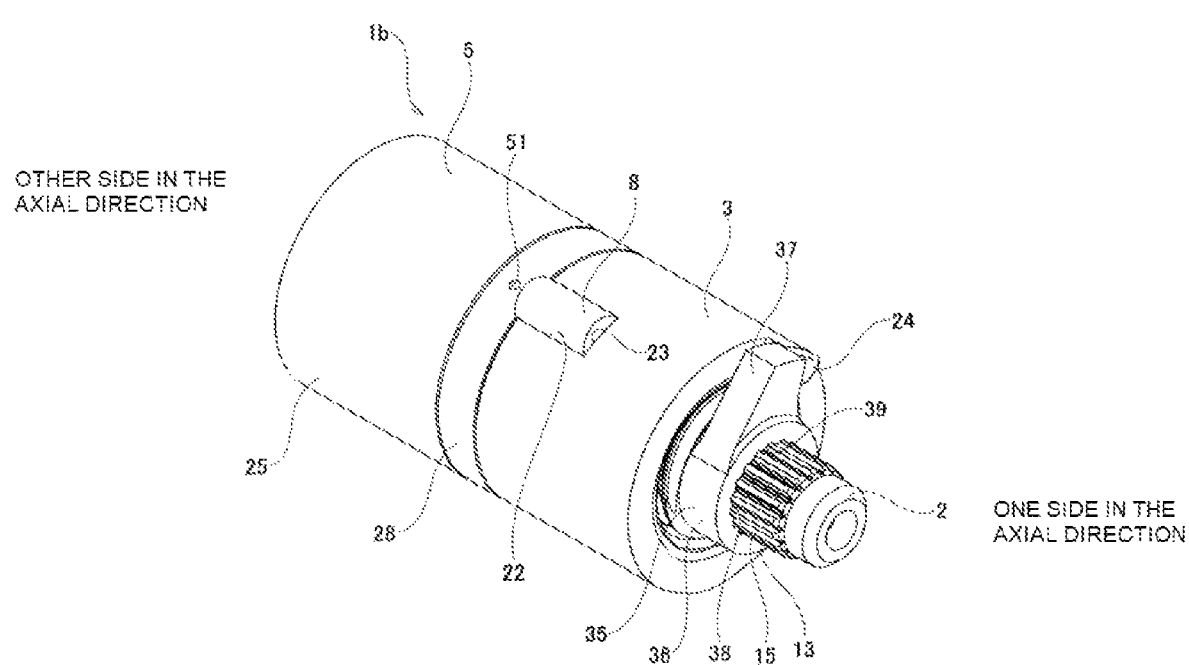
FIG. 13 is a perspective view of the ball screw device of the fourth example, omitting the housing and drive member.
Figure 14:
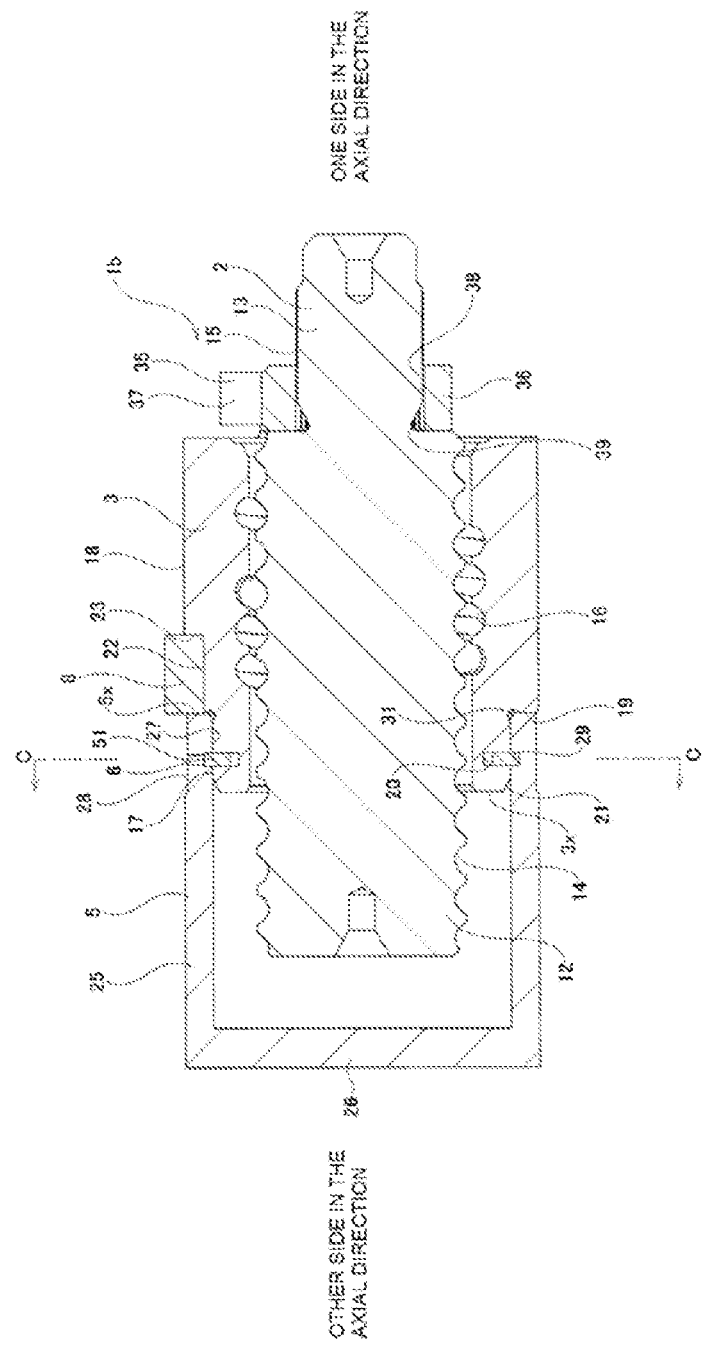
FIG. 14 is a diagram corresponding to FIG. 4 of the ball screw device of the fourth example.

A third example of an embodiment of the present disclosure will be described with reference to FIG. 11.

In a ball screw device 1*a* of the present example, unlike the ball screw device 1 of the first and second examples, a piston 5*a* is internally fitted and fixed to a nut 3*a*.

In the present example, an inner peripheral surface of the nut 3*a* is configured by a stepped cylindrical surface. The nut 3*a*, at an end portion on the other side in the axial direction of the inner peripheral surface, has a cylindrical first fitting surface 17*b* to which the piston 5*a* is internally fitted, and in a range from an intermediate portion in the axial direction of the inner peripheral surface to a portion on the one side in the axial direction, has a small-diameter surface 47 having an inner diameter smaller than that of the first fitting surface 17*b* and having a nut-side ball screw groove 16 formed on an inner peripheral surface thereof.

An inner diameter of the first fitting surface 17*b* is constant along the axial direction except for a portion where a first retaining ring groove 20*a* is formed.

The first fitting surface 17*b*, in an intermediate portion in the axial direction, has a first retaining ring groove 20*a* for locking an outer diameter side portion of the retaining ring 6 around the entire circumference. The first retaining ring groove 20*a* has a rectangular cross-sectional shape, and is formed by machining such as cutting based on an end surface 3*x* on the other side in the axial direction of the nut 3*a*. A depth in the radial direction of the first retaining ring groove 20*a* is smaller than a width in the radial direction of the retaining ring 6. In addition, a width in the axial direction of the first retaining ring groove 20*a* is slightly larger than a thickness in the axial direction of the retaining ring 6.

The nut 3*a* has a small-diameter stepped portion 48 at an end portion on the other side in the axial direction of the outer peripheral surface. The small-diameter stepped portion 48 is arranged on an outer side in the radial direction of the first fitting surface 17*b*, and has an outer diameter that is slightly smaller than that of a portion separated in the axial direction from the small-diameter stepped portion 48. A portion of the nut 3*a* separated in the axial direction from the small-diameter stepped portion 48 has the same outer diameter as a large-diameter surface 49 of the piston 5*a*. Note that a portion of the nut 3*a* separated in the axial direction from the small-diameter stepped portion 48 having the same outer diameter as a large-diameter surface 49 of the piston 5*a* is not limited to a case of having an outer diameter that completely matches the outer diameter of the large-diameter surface 49, and includes a case where the outer diameter is substantially the same as the outer diameter of the large diameter surface 49 within an inevitable manufacturing tolerance range.

The end surface 3*x* on the other side in the axial direction of the nut 3*a* and the first fitting surface 17*b* are connected through a tapered first chamfered portion 21*a*.

In the present example, an outer peripheral surface of the piston 5*a* is configured by a stepped cylindrical surface. The piston 5*a* has a cylindrical second fitting surface 27*a* at an end portion on the one side in the axial direction of the outer peripheral surface, and has a cylindrical large-diameter surface 49 in a range extending from an intermediate portion in the axial direction of the outer peripheral surface to a portion on the other side in the axial direction. In addition, the outer peripheral surface of the piston 5*a*, between the second fitting surface 27*a* and the large-diameter surface 49, has an annular stepped surface 50 facing toward the one side in the axial direction. The stepped surface 50 is a flat surface that exists on a virtual plane perpendicular to the central axis of the piston 5*a*. An outer diameter of the large-diameter surface 49 is the same as the outer diameter (maximum outer diameter) of the nut 3*a*.

An outer diameter of the second fitting surface 27*a* is constant in the axial direction except for a portion where a second retaining ring groove 29a is formed, and is slightly larger than an inner diameter of the first fitting surface 17a of the nut 3a.

The second fitting surface 27a, at an intermediate portion in the axial direction, includes the second retaining ring groove 29a for locking a portion on an inner diameter side of the retaining ring 6 around the entire circumference. The second retaining ring groove 29a is formed by machining such as cutting based on the stepped surface 50 of the piston 5a. The second retaining ring groove 29a has a rectangular cross-sectional shape, and is provided in a portion facing the first retaining ring groove 20a in the radial direction in a state where the piston 5a is internally fitted and fixed to the nut 3a. A depth in the radial direction of the second retaining ring groove 29a is the same or slightly larger than a width in the radial direction of the retaining ring 6. In addition, a width in the axial direction of the second retaining ring groove 29a is slightly larger than a thickness in the axial direction of the retaining ring 6.

An end surface 5x on the one side in the axial direction of the piston 5a and the second fitting surface 27a are connected through a second chamfered portion 30 having a tapered surface shape.

In the present example, an end portion on the one side in the axial direction of the piston 5a is internally fitted and fixed by press fitting to the end portion on the other side in the axial direction of the nut 3a. As a result, the first fitting surface 17b and the second fitting surface 27a are brought into contact with each other over the entire length in the axial direction with an interference. In addition, in a state in which the piston 5a is internally fitted and fixed to the nut 3a, the end surface 3x on the other side in the axial direction of the nut 3a is abutted in the axial direction against the stepped surface 50 provided on the outer peripheral surface of the piston 5a.

In a state in which the piston 5a is internally fitted and fixed to the nut 3a, the retaining ring 6 is engaged so as to span between the first retaining ring groove 20a of the nut 3a and the second retaining ring groove 29a of the piston 5a. More specifically, the outer diameter side portion of the retaining ring 6 is engaged with the first retaining ring groove 20a, and the inner diameter side portion of the retaining ring 6 is engaged with the second retaining ring groove 29a.

In the present example, the assembly work of assembling the retaining ring 6 can be performed, for example, as follows.

First, by pushing the end portion on the one side in the axial direction of the piston 5a inside the retaining ring 6, the diameter of the retaining ring 6 is elastically expanded by using a second chamfered portion 30a, and the retaining ring 6 is locked in the second retaining ring groove 29a. Next, by reducing the diameter of the retaining ring 6 by using the first chamfered portion 21a of the nut 3a, the end portion on the one side in the axial direction of the piston 5a is press fitted with the end portion on the other side in the axial direction of the nut 3a while the retaining ring 6 is pressed inside the second retaining ring groove 29a. Then, in a state in which the end surface 3x on the other side in the axial direction of the nut 3a abuts the stepped surface 50 of the piston 5a, and the positions in the axial direction of the first retaining ring groove 20a and the second retaining ring groove 29a are aligned, the retaining ring is 6 is elastically restored. As a result, the retaining ring 6 can be locked so as to span between the first retaining ring groove 20a of the nut 3a and the second retaining ring groove 29a of the piston 5a.

In the present example, in order to prevent rotation of the nut 3a, a holding recessed portion 22a for holding a rotation-locking member 8 is provided on the outer peripheral surface of the piston 5a. Holding recessed portions 22a are provided at a plurality of locations (for example, two locations) in the circumferential direction of the outer peripheral surface of the piston 5a. The holding recessed portions 22a are provided at portions of the outer peripheral surface of the piston 5a on the one side in the axial direction of the large-diameter surface 49.

The holding recessed portion 22a is a recessed groove that extends in the axial direction. The holding recessed portion 22a, at an end portion on the other side in the axial direction, has a blocking surface 23a facing the one side in the axial direction. An end portion on the one side in the axial direction of the holding recessed portion 22a opens to the stepped surface 50. Therefore, the holding recessed portion 22a is open to both the outer peripheral surface and the stepped surface 50 of the piston 5a. The central axis of the holding recessed portion 22a is arranged parallel to the central axis of the piston 5a. A dimension in the axial direction from the stepped surface 50 to the blocking surface 23a is slightly larger than a dimension in the axial direction of the rotation-locking member 8. The blocking surface 23a is a flat surface that exists on a virtual plane perpendicular to the central axis of the piston 5a, and has a partially circular shape (substantially semicircular shape) when viewed in the axial direction.

The holding recessed portion 22a has a cross-sectional shape that is capable of engaging in the circumferential direction with a portion on an inner side in the radial direction of the rotation-locking member 8. In the present example, the rotation-locking member 8 is configured in a cylindrical shape, and thus the cross-sectional shape of the holding recessed portion 22a with respect to an imaginary plane perpendicular to the central axis of the piston 5a is an arc. In addition, a diameter of an inscribed circle passing through a portion of the holding recessed portion 22a where the depth in the radial direction is the largest is equal to or larger than the outer diameter of the second fitting surface 27a.

In the present example, the rotation-locking member 8 is arranged so as to be sandwiched in the radial direction between the holding recessed portion 22a provided on the outer peripheral surface of the piston 5a and the guide recessed groove 31 (see FIG. 1) provided on an inner peripheral surface of an insertion hole 9 of the housing 7 (not illustrated).

A portion on an inner side in the radial direction of the rotation-locking member 8 is arranged inside the holding recessed portion 22a. In addition, the portion on the inner side in the radial direction of the rotation-locking member 8 is sandwiched in the axial direction between the blocking surface 23a of the holding recessed portion 22a and the end surface 3x on the other side in the axial direction of the nut 3a. In other words, the end surface on the other side in the axial direction of the rotation-locking member 8 faces the blocking surface 23a in the axial direction, and the end surface on the one side in the axial direction of the rotation-locking member 8 faces the end surface 3x on the other side in the axial direction of the nut 3a. Therefore, the rotation-locking member 8 is prevented from coming out in the axial direction by the blocking surface 23a and the end surface 3x on the other side in the axial direction of the nut 3a. As a result, the portion on the inner side in the radial direction of the rotation-locking member 8 is arranged inside the holding recessed portion 22a so as not to move in the axial direction.

In the present example, a dimension in the axial direction of the rotation-locking member 8, is set to be slightly smaller than a dimension in the axial direction from the stepped surface 50 of the piston 5a to the blocking surface 23a of the holding recessed portion 22a. Therefore, in a state in which the piston 5a is internally fitted and fixed to the nut 3a, the dimension in the axial direction of the rotation-locking member 8 is slightly smaller than the distance in the axial direction from the end surface 3x on the other side in the axial direction of the nut 3a abutted against the stepped surface 50 to the blocking surface 23a. Accordingly, a gap is formed between the end surface on the other side in the axial direction of the rotation-locking member 8 and the blocking surface 23a, and/or between the end surface on the one side in the axial direction of the rotation-locking member 8 and the end surface 3x on the other side in the axial direction of the nut 3a. In other words, the end surfaces on both sides in the axial direction of the rotation-locking member 8 do not simultaneously come in contact with the blocking surface 23a and the end surface 3x on the other side in the axial direction of the nut 3a which face them in the axial direction.

The portion on the outer side in the radial direction of the rotation-locking member 8 is arranged inside the guide recessed groove 31 so as to slide in the axial direction.

In the case of the present example as well, relative displacement in the axial direction between the nut 3a and the piston 5a can be effectively prevented without increasing the manufacturing cost, and the size of the entire device can be reduced and the load capacity can be increased.

In the present example, the small-diameter stepped portion 48 is provided at the end portion on the other side in the axial direction of the outer peripheral surface of the nut 3a, and thus even in a case where the diameter of the small-diameter stepped portion 48 is expanded by press fitting the second fitting surface 27a into the first fitting surface 17b and/or the first retaining ring groove 20a is formed in the first fitting surface 17b, it is possible to effectively prevent the small-diameter stepped portion 48, the roundness of which has decreased due to the diameter expansion, from coming into sliding contact with the inner peripheral surface of the insertion hole 9.

The first retaining ring groove 20a is formed based on the end surface 3x on the other side in the axial direction of the nut 3a, and the second retaining ring groove 29a is formed based on the stepped surface 50 provided on the piston 5a, and thus when the end surface 3x on the other side in the axial direction of the nut 3a abuts against the stepped surface 50 of the piston 5a during assembly work of the ball screw device 1a, the positions in the axial direction of the first retaining ring groove 20a and the second retaining ring groove 29a can be precisely matched.

In the present example, the holding recessed portions 22a are formed on the outer peripheral surface of the piston 5a and it is not necessary to form holding recessed portions on the outer peripheral surface of the nut 3a, and thus it is not necessary to increase the outer diameter (thickness) of the nut 3a in order to secure the strength of the nut 3a. Therefore, the size of the ball screw device 1a can be reduced. In addition, it is not necessary to consider the formation positions of the holding recessed portions 22a in relation to the circulation grooves 11 (see FIG. 7) provided on the inner peripheral surface of the nut 3a. Accordingly, freedom in designing the ball screw device Ta can be improved, and thus the manufacturing cost of the ball screw device 1a can be reduced.

Other configurations and effects of the third example are the same as those of the first example.

Fourth Example

A fourth example of an embodiment according to the present disclosure will be described with reference to FIGS. 12 to 16.

The present example is a modification of the first example. In the ball screw device 1 of the first example, the retaining ring 6 cannot be visually recognized from the outside after assembly, and thus it cannot be confirmed from the outside whether or not the retaining ring 6 is assembled. Therefore, a ball screw device Tb of the present example has a confirmation window hole 51 for confirming from the outside whether or not the retaining ring 6 is assembled.

In the present example, the piston 5 is externally fixed to the nut 3. Therefore, an end portion in the axial direction of the cylindrical portion 25 of the piston 5 is arranged to cover a retaining ring 6 from outside in the radial direction. Therefore, a confirmation window hole 51 penetrating in the radial direction is formed at an end portion on the one side in the axial direction of the cylindrical portion 25. The confirmation window hole 51 is formed in a portion overlapping in the radial direction the second retaining ring groove 29 formed in the second fitting surface 27. Accordingly, the confirmation window hole 51 is formed in a portion overlapping in the radial direction the retaining ring 6 that is engaged with the second retaining ring groove 29.

The confirmation window hole 51 of the present example is a circular through hole (round holes) that is open only on both sides in the radial direction of the cylindrical portion 25. That is, the confirmation window hole 51 opens only to the small-diameter stepped portion 28 provided on an outer peripheral surface of the cylindrical portion 25 and the second fitting surface 27 provided on an inner peripheral surface of the cylindrical portion 25. The confirmation window hole 51 has an inner diameter slightly smaller than a width in the axial direction of the second retaining ring groove 29. Therefore, the confirmation window hole 51 opens at a groove bottom of the second retaining ring groove 29. Note that alternatively an inner diameter of the confirmation window hole may be the same as or larger than the width in the axial direction of the second retaining ring groove. In such a case, the confirmation window hole is provided so as to divide the second retaining ring groove in the circumferential direction. In addition, the shape of the confirmation window hole can be changed as appropriate.

Figure 15:
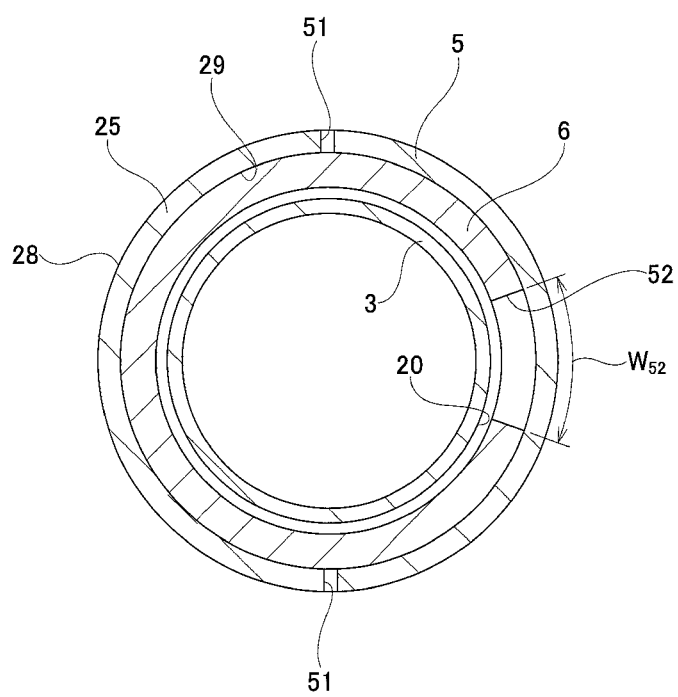
FIG. 15 is a schematic diagram corresponding to the cross section along line C-C of FIG. 14.

In the present example, confirmation window holes 51 are provided at a plurality of locations (two locations in the illustrated example) in the circumferential direction of the cylindrical portion 25. The confirmation window holes 51 are arranged at uniform intervals in the circumferential direction. In the present example, as illustrated in FIG. 15, an interval between a pair of confirmation window holes 51 adjacent in the circumferential direction is set to be larger than a width dimension $W_{52}$ in the circumferential direction of a discontinuous portion 52 provided at one location in the circumferential direction of the retaining ring 6. Note that the confirmation window hole 51 can be covered with a pin or the like, if necessary, after an inspection process of the retaining ring 6 is completed.

<Manufacturing Method of Ball Screw Device>

When manufacturing the ball screw device 1b of the present example, a process of inspecting the retaining ring 6 may be included in the manufacturing process (after the assembly process).

There are two types of inspection processes: a method of performing a visual inspection, and a method of performing inspection using an inspection jig 53 or a sensor such as a laser sensor, and either one of the methods can be implemented, or a combination of the two methods can be implemented. In a case of implementing the two methods in combination, after implementing the visual method, the method using the inspection jig 53 or the sensor is implemented.

More specifically, the visual inspection method is performed as follows.

After assembling the ball screw device Tb, assembly is visually confirmed through the confirmation window hole 51 as to whether or not the retaining ring 6 is assembled. Note that whether or not the retaining ring 6 is assembled cannot be determined correctly by using a confirmation window hole 51 arranged in a portion that is in phase with the discontinuous portion 52 of the retaining ring 6, and thus in a case where visual inspection is performed using one confirmation window hole 51 and it is not possible to confirm the presence of the retaining ring 6, visual inspection is then performed using the other confirmation window hole 51. In this way, by the visual inspection method, it is possible to easily confirm whether or not the retaining ring 6 is assembled without using any tools.

Figure 16:
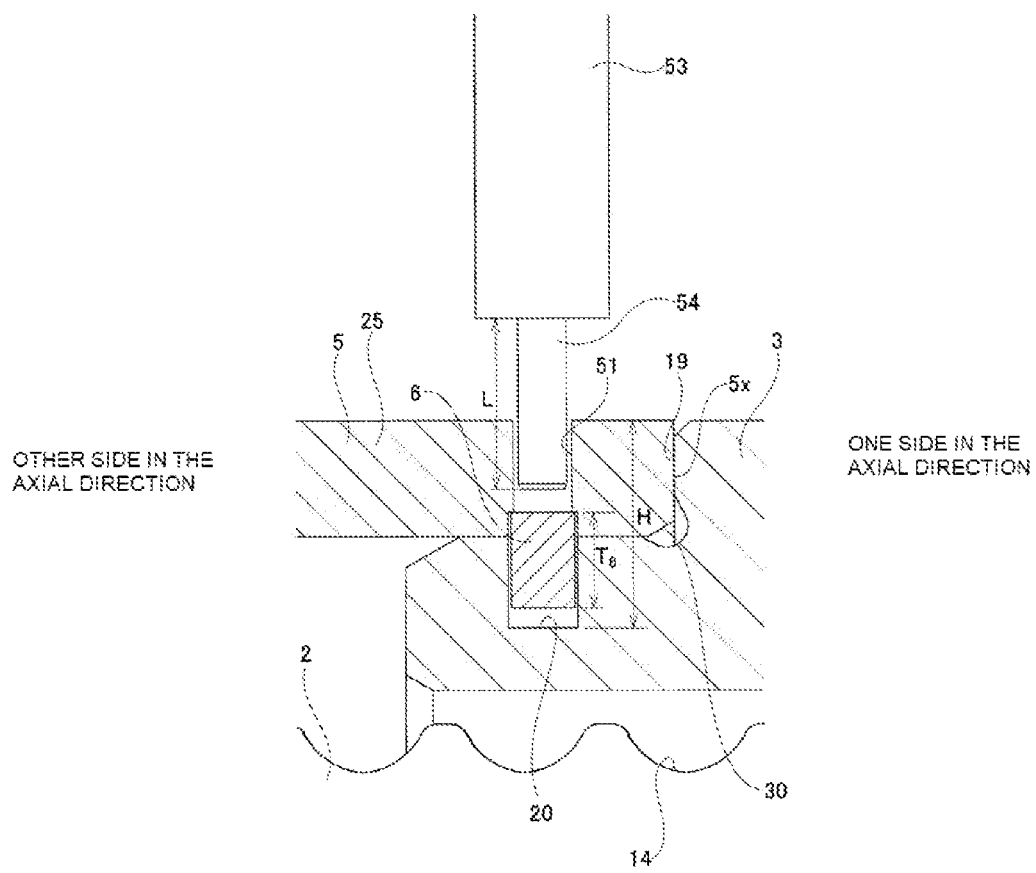
FIG. 16 is a partial enlarged view of FIG. 14 for explaining an inspection process in a manufacturing process of the ball screw device of the fourth example.

The inspection method using the inspection jig 53 is specifically performed as illustrated in FIG. 16.

After assembling the ball screw device Tb, a tip-end portion 54 of the inspection jig 53 is inserted into the confirmation window hole 51. Here, the tip-end portion 54 has a shape such as to be able to be inserted into the confirmation window hole 51 without looseness, and has a columnar shape in the illustrated example. A total length L of the tip-end portion 54 is set to be the same as a dimension H in the radial direction from the outer peripheral surface of the piston 5 to the groove bottom surface of the first retaining ring groove 20.

An operation of inserting the tip-end portion 54 is performed until a tip-end surface of the tip-end portion 54 abuts against a mating member and the tip-end portion 54 cannot be inserted further inside the confirmation window hole 51. Then, in this state, an insertion depth of the tip-end portion 54 of the inspection jig 53 is measured. The insertion depth may be measured by any method; for example, can be measured by reading a scale attached to an outer peripheral surface of the tip-end portion 54 at a position of an outer peripheral surface of the cylindrical portion 25. Based on the insertion depth of the tip-end portion 54 of the inspection jig 53, it is determined (inspected) whether or not the retaining ring 6 is present and whether the retaining ring 6 is properly assembled.

More specifically, when the measured value of the insertion depth matches the value obtained by subtracting a radial width $T_6$ of the retaining ring 6 from the radial dimension H, it is determined that the retaining ring 6 is properly assembled.

On the other hand, when the tip-end portion 54 of the inspection jig 53 is inserted into each of the two confirmation window holes 51 and the measured values of the insertion depth match the radial dimension H, it is determined that the retaining ring 6 is not assembled. The reason for inserting the tip-end portion 54 inside the two confirmation window holes 51 is that the phase of a confirmation window hole 51 at one location may match the phase of the discontinuous portion of the retaining ring 6, as in the case of the visual inspection method.

In a case where the measured insertion depth is greater than the value obtained by subtracting the radial width $T_6$ from the radial dimension H but less than the radial dimension H, or less than the value obtained by subtracting the radial width $T_6$ from the radial dimension H, it is determined that the retaining ring 6 is assembled, but not properly assembled.

As described above, with the inspection method using the inspection jig 53, it is possible to easily check not only the presence or absence of the retaining ring 6 but also whether the retaining ring 6 is properly assembled. Note that the inspection process performed using the inspection jig 53 can be automatically performed using an inspection device, or can be performed by an operator. Note that, even in a case of an inspection method using a sensor, except for measuring a distance from the sensor to an object (the outer peripheral surface of the retaining ring 6 or the bottom surface of the first retaining ring groove 20 or the second retaining ring groove 29) by the sensor using the confirmation window hole 51, the operation and effect are basically the same as the inspection method using the inspection jig 53.

In addition, when the visual method and the method using the inspection jig 53 (or a method using a laser) are combined, the presence or absence of the retaining ring 6 can be quickly and easily determined first by the visual method, and thus it is possible to just perform inspection using the inspection jig 53 (or inspection using a laser) for inspecting an object to which the retaining ring 6 is assembled. Therefore, it is possible to improve the inspection efficiency.

With the ball screw device 1b of the present example, relative displacement in the axial direction between the nut 3 and the piston 5 can be effectively prevented without increasing the manufacturing cost, and the size of the entire device can be reduced and the load capacity can be increased, and after assembling the ball screw device 1b, it is possible to easily confirm whether or not the retaining ring 6 is assembled.

In particular, in the present example, it is possible to easily check whether or not the retaining ring 6 is assembled by using the confirmation window hole 51 provided at the one end in the axial direction of the cylindrical portion 25 constituting the piston 5. Therefore, forgetting to attach the retaining ring 6 may be prevented in advance.

In addition, if a method using an inspection jig 53 is performed as an inspection process for the retaining ring 6, it is possible to easily confirm not only the presence or absence of the retaining ring 6 but also whether the retaining ring 6 is properly assembled. Therefore, it is possible to prevent breakage or damage to the ball screw device 1b due to improper assembly of the retaining ring 6, and to ensure the quality of the ball screw device 1b.

Other configurations and effects of the fourth example are the same as those of the first example.

Fifth Example

Figure 17:
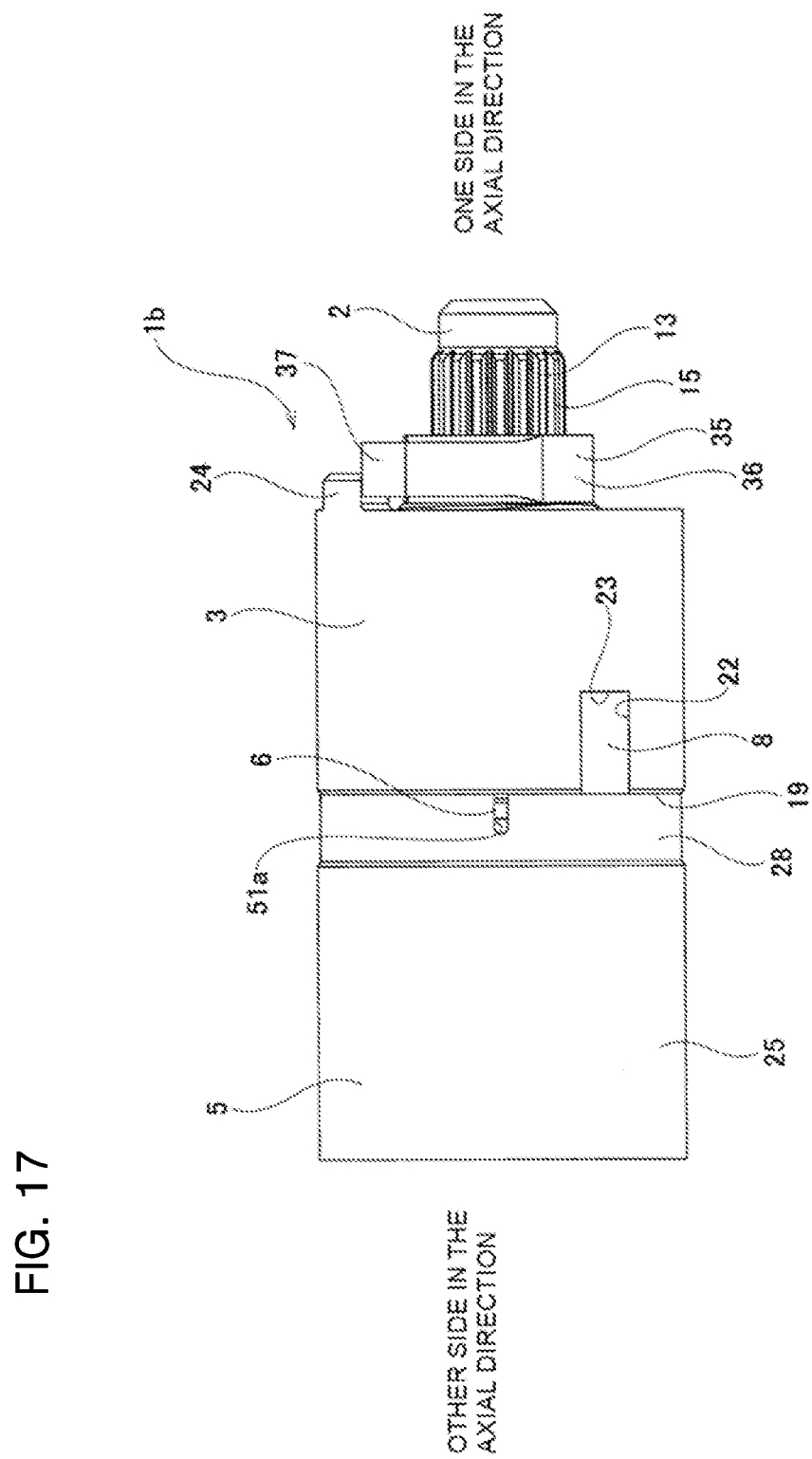
FIG. 17 is a diagram corresponding to FIG. 12 of a ball screw device of a fifth example of an embodiment according to the present disclosure.
Figure 18:
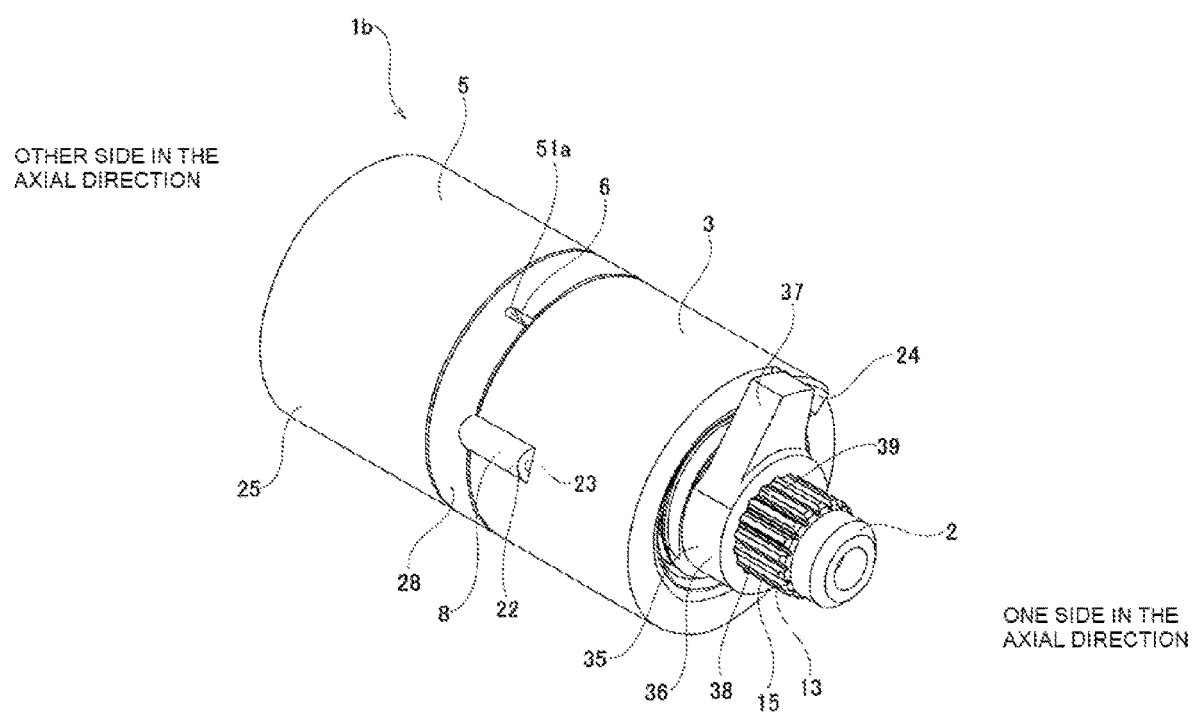
FIG. 18 is a diagram corresponding to FIG. 13 of the ball screw device of the fifth example.

A fifth example of an embodiment according to the present disclosure will be described with reference to FIG. 17 and FIG. 18.

In the present example, only the shape of a confirmation window hole 51a is changed from the structure of the fourth example.

In the present example, the confirmation window hole 51a is not only open on both sides in the radial direction of a cylindrical portion 25, but is a notch hole (slit) open to the end portion on the one side in the axial direction of the cylindrical portion 25. The confirmation window hole 51a has a substantially oval shape with a dimension in the axial direction being longer than a circumferential dimension thereof. The dimension in the axial direction of the confirmation window hole 51a is larger than a width in the axial direction of a second retaining ring groove 29 (a retaining ring 6).

In the present example, a plate-shaped inspection jig with a tip-end portion having a shape capable of being inserted into the confirmation window hole 51a without looseness can be used as an inspection jig.

In the present example, the confirmation window hole 51a can be formed by cutting using a cutter or the like, and thus the processing cost can be reduced.

Other configurations and effects of the fifth example are the same as those of the first and fourth examples.

Sixth Example

Figure 19:
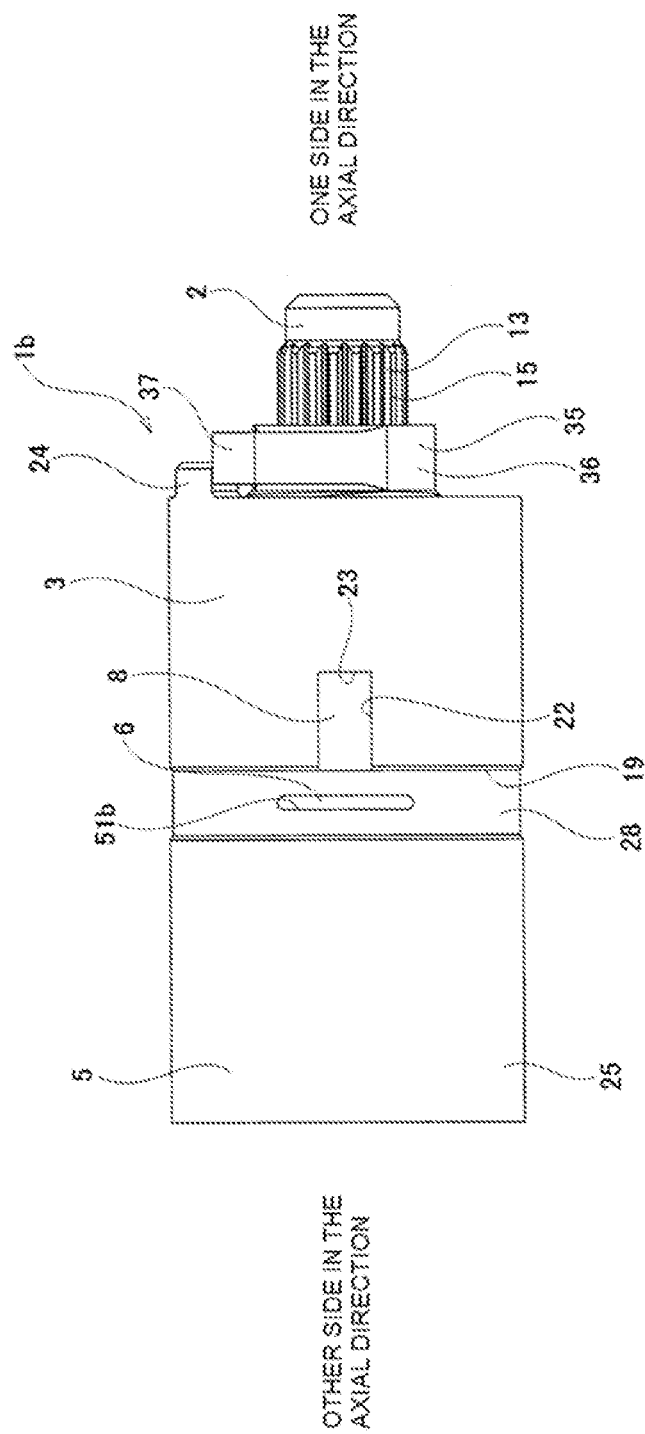
FIG. 19 is a diagram corresponding to FIG. 12 of a ball screw device of a sixth example of an embodiment according to the present disclosure.
Figure 20:
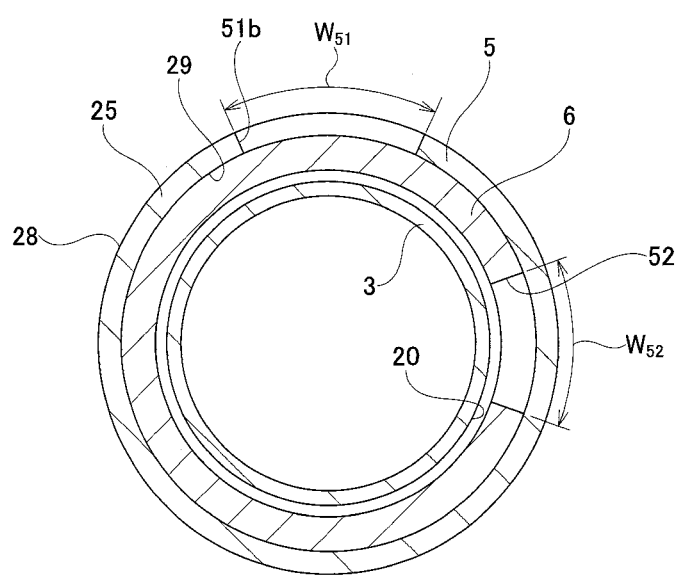
FIG. 20 is a diagram corresponding to FIG. 15 of the ball screw device of the sixth example.

A sixth example of an embodiment according to the present disclosure will be described with reference to FIG. 19 and FIG. 20.

In the present example, a shape of a confirmation window hole 51b and a number of formed confirmation window holes 51b are changed from the structures of the fourth and fifth examples.

In the present example, the confirmation window hole 51b is a through hole having an oval shape (elliptical hole) that is open only on both sides in the radial direction of a cylindrical portion 25. In addition, the confirmation window hole 51b has a larger dimension in the circumferential direction than a dimension in the axial direction. A dimension $W_{51}$ in the circumferential direction of the confirmation window hole 51b is larger than a width dimension $W_{52}$ in the circumferential direction of the discontinuous portion 52 of the retaining ring 6 ($W_{51}$>$W_{52}$).

In the present example, the confirmation window hole 51b is provided only at one location in the cylindrical portion 25 in the circumferential direction.

In the case of the present example as well, a plate-like inspection jig with a tip-end portion capable of being inserted into the confirmation window hole 51b without looseness can be used as an inspection jig.

In the present example, a dimension $W_{51}$ in the circumferential direction of the confirmation window hole 51b is set to be larger than the width dimension $W_{52}$ in the circumferential direction of the discontinuous portion 52 of the retaining ring 6, and thus even in a case where the confirmation window hole 51b and the discontinuous portion 52 are arranged so as to overlap in the radial direction, a portion of the retaining ring 6 can be always exposed inside the confirmation window hole 51b. Therefore, the presence or absence of the retaining ring 6 can be easily confirmed. In addition, with the inspection process using the inspection jig, it is possible to easily check whether or not the retaining ring is properly assembled. As described above, in the present example, the inspection process of inspecting the retaining ring 6 can be performed by forming only one confirmation window hole 51b, so that the processing cost can be reduced.

Other configurations and effects of the sixth example are the same as those of the first and fourth examples.

Seventh Example

Figure 21:
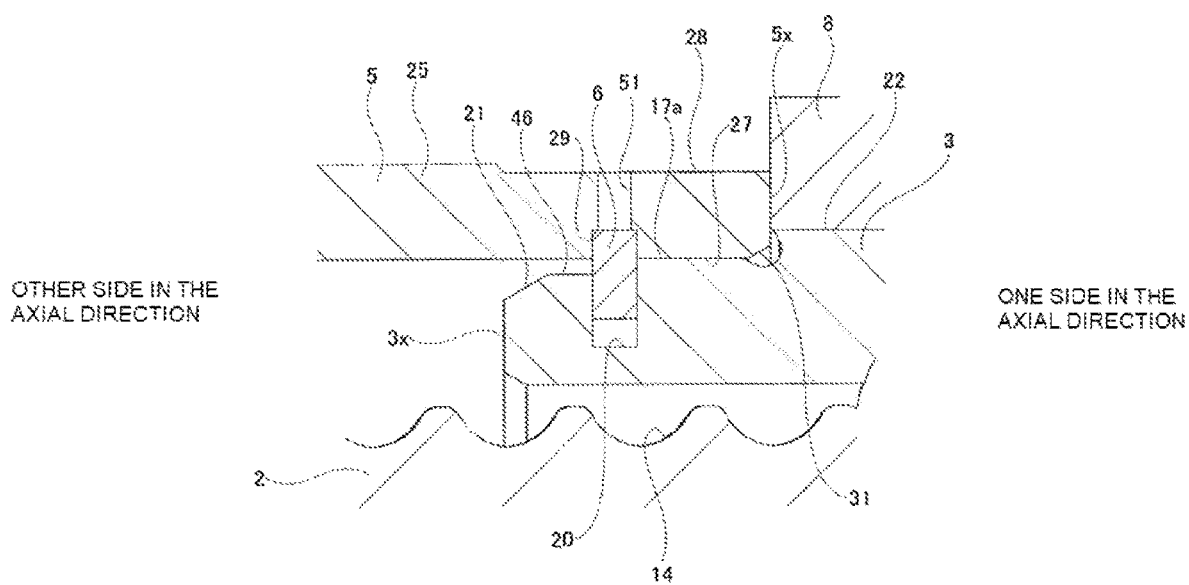
FIG. 21 is a partial enlarged cross-sectional view of a ball screw device of a seventh example of an embodiment according to the present disclosure.

A seventh example of an embodiment of the present disclosure will be described with reference to FIG. 21.

The present example is a modification of the second example. In the present example, the first fitting surface 17a provided at an end portion on the other side in the axial direction of an outer peripheral surface of the nut 3 is formed into a stepped shape. The first fitting surface 17a has the small-diameter portion 46 provided at a portion further on the other side in the axial direction than the first retaining ring groove 20 and having a smaller outer diameter than a portion located on the opposite side across the first retaining ring groove 20.

In a case of the present example as well, the confirmation window hole 51 is provided at an end portion on the one side in the axial direction of the cylindrical portion 25 of the piston 5 arranged so as to cover the retaining ring 6 from outside in the radial direction. More specifically, the confirmation window hole 51 is formed at a portion of the end portion on the one side in the axial direction of the cylindrical portion 25 that overlaps in the radial direction the second retaining ring groove 29 formed in the second fitting surface 27.

In a case of the present example as well, similar to the structure of the second example, an amount of diameter expansion of the retaining ring 6 when engaging the retaining ring 6 in the first retaining ring groove 20 can be reduced compared to the first example. Therefore, the assembly work of the ball screw device 1 can be facilitated.

Other configurations and effects of the seventh example are the same as those of the first, second, and fourth examples.

Eighth Example

Figure 22:
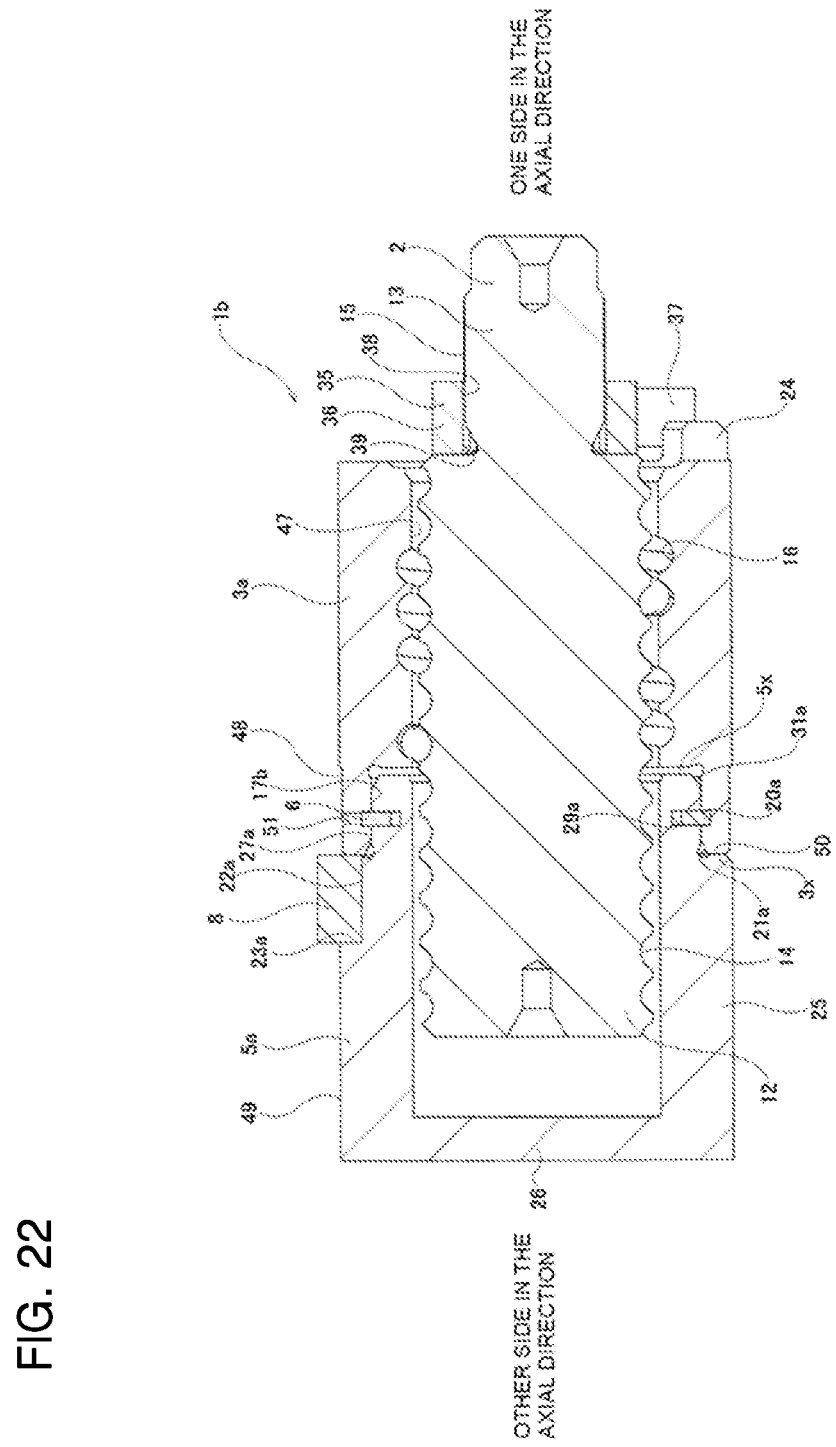
FIG. 22 is a cross-sectional view corresponding to FIG. 14 of a ball screw device of an eighth example of an embodiment according to the present disclosure.

An eighth example of an embodiment of the present disclosure will be described with reference to FIG. 22.

The present example is a modification of the third example. That is, in the ball screw device 1b of this example, the piston 5a is internally fitted and fixed to the nut 3a. Therefore, the end portion on the other side in the axial direction of the nut 3a is arranged so as to cover the retaining ring 6 from outside in the radial direction.

In the present example, the confirmation window hole 51 penetrating in the radial direction is formed at an end portion on the other side in the axial direction of the nut 3a. More specifically, the confirmation window hole 51 is formed in a portion overlapping in the radial direction the first retaining ring groove 20a formed in the first fitting surface 17b. Therefore, the confirmation window hole 51 is formed in a portion overlapping in the radial direction the retaining ring 6 engaged with the first retaining ring groove 20a.

In a case of the present example as well, the confirmation window hole 51 is a circular through hole (round hole) that is open only on both sides in the radial direction of the nut 3a. That is, the confirmation window hole 51 opens only to the small-diameter stepped portion 48 provided on an outer peripheral surface of the nut 3a and to the first fitting surface 17b provided on in inner peripheral surface of the nut 3a. The confirmation window hole 51 has an inner diameter slightly smaller than a width in the axial direction of the first retaining ring groove 20a. Therefore, the confirmation window hole 51 opens at the groove bottom of the first retaining ring groove 20a.

In the present example, confirmation window holes 51 are provided at a plurality of locations in the circumferential direction of the nut 3a. The plurality of confirmation window holes 51 are arranged at uniform intervals in the circumferential direction. In addition, the interval between a pair of confirmation window holes 51 adjacent in the circumferential direction is set larger than the width $W_{52}$ in the circumferential direction of the discontinuous portion 52 (see FIG. 15) of the retaining ring 6.

In a case of the present example as well, using the confirmation window holes 51 provided in the nut 3a, it is possible to confirm the presence or absence of the retaining ring 6 and whether the retaining ring 6 is properly assembled is checked visually and/or using an inspection jig.

Other configurations and effects of the eighth example are the same as those of the first, third, and fourth examples.

Embodiments according to the present disclosure have been described above; however, the content of the present disclosure is not limited to this, and can be changed as appropriate without departing from the technical idea of the present disclosure. In addition, the structures of each of the examples of an embodiment of the present disclosure can be combined as appropriate and implemented as long as there is no contradiction.

In a case of implementing the contents of the present disclosure, the shape of the confirmation window hole is not limited to the shape illustrated in each example, and can be changed as appropriate as long as the presence or absence of a retaining ring can be confirmed. Moreover, the number and formation positions of the confirmation window holes are not limited to the structures illustrated in the respective examples, and can be changed as appropriate.

In each example of an embodiment according to the present disclosure, in order to prevent the relative rotation of the nut with respect to the housing, a case of adopting a structure in which a rotation-locking member is sandwiched from both sides in the radial direction between a holding recessed portion provided on the outer peripheral surface of the nut or the piston (fitting cylinder) and a guide recessed groove provided on the inner peripheral surface of the insertion hole of the housing has been described. However, in a case of implementing the contents of the present disclosure, the structure for preventing the nut from relatively rotating with regard to the housing is not limited to a structure using such a rotation-locking member, and a key structure or other various types of conventionally known structures can be appropriately adopted.

In each example of an embodiment according to the present disclosure, a case of using a piston as a fitting cylinder has been described; however, in a case of implementing the contents of the present disclosure, not only the piston but also other members having other functions may also be used.

REFERENCE SIGNS LIST 1, 1a, 1b Ball screw device
2 Screw shaft
3, 3a Nut
3x End surface
4 Ball
5, 5a Piston
5x End surface
6 Retaining ring
7 Housing
8 Rotation-locking member
9 Insertion hole
10 Load path
11 Circulation groove
12 Screw portion
13 Fitting shaft portion
14 Shaft-side ball screw groove
15 Male spline teeth
16 Nut-side ball screw groove
17, 17a, 17b First fitting surface
18 Large-diameter surface
19 Stepped surface
20, 20a First retaining ring groove
21, 21a First chamfered portion
22, 2a Holding recessed portion
23, 23a Blocking surface
24 Non-rotating side engaging portion
25 Cylindrical portion
26 Bottom plate portion
27, 27a Second fitting surface
28 Small-diameter stepped portion
29, 29a Second retaining ring groove
30, 30a Second chamfered portion
31 Guide recessed groove
32 Abutting surface
33a, 33b Seal recessed groove
34a, 34b O-ring
35 Stopper
36 Boss portion
37 Rotation-side engaging portion
38 Engaging hole
39 Female spline teeth
40 Driving member
41 Substrate portion
42 Tube portion
43 Torque input portion
44 Installation hole
45 Female spline teeth
46 Small-diameter portion
47 Small-diameter surface
48 Small-diameter stepped portion
49 Large-diameter surface
50 Stepped surface
51, 51a, 51b Confirmation window hole
52 Discontinuous portion
53 Inspection jig
54 Tip-end portion
100 Ball screw device
101 Screw shaft
102 Nut
103 Ball
104 Piston
105 Housing
106 Shaft-side ball screw groove
107 Rolling bearing
108 Driven gear
109 Idle gear
110 Nut-side ball screw groove
111 Load path
112 Stepped surface
113 Retaining ring
114 Key groove
115 Insertion hole
116 Fitting groove
117 Key

The invention claimed is:

1. A ball screw device, comprising:
a screw shaft having a shaft-side ball screw groove with a spiral shape on an outer peripheral surface and configured to undergo rotational motion during use;
a nut having a nut-side ball screw groove with a spiral shape on an inner peripheral surface and configured to undergo linear motion during use;
balls arranged between the shaft-side ball screw groove and the nut-side ball screw groove;

a fitting cylinder having an end portion on one side in an axial direction that is fitted and fixed to an end portion on an other side in the axial direction of the nut and configured to undergo linear motion together with the nut; and a retaining ring configured to prevent relative displacement in the axial direction between the nut and the fitting cylinder;

the nut having a first fitting surface provided with a first retaining ring groove on an end portion on the other side in the axial direction;

the fitting cylinder, at an end portion on the one side in the axial direction, having a second fitting surface provided with a second retaining ring groove in a portion facing the first retaining ring groove with regard to a radial direction; and the retaining ring engaged so as to span between the first retaining ring groove and the second retaining ring groove.

2. The ball screw device according to claim 1, wherein a maximum outer diameter of the fitting cylinder is the same as a maximum outer diameter of the nut.

3. The ball screw device according to claim 1, wherein the fitting cylinder is fitted to the nut by press fitting or clearance fitting.

4. The ball screw device according to claim 1, wherein an outer peripheral surface of the nut includes the first fitting surface, a large-diameter surface arranged adjacent on the one side in the axial direction of the first fitting surface and having an outer diameter larger than that of the first fitting surface, and a stepped surface arranged between the first fitting surface and the large-diameter surface and facing the other side in the axial direction; and the fitting cylinder is externally fitted and fixed to the nut, with an end surface on the one axial side in axial direction thereof abutting against the stepped surface in the axial direction.

5. The ball screw device according to claim 4, wherein the first retaining ring groove is formed in a portion separated in the axial direction from the nut-side ball screw groove.

6. The ball screw device according to claim 4, wherein the fitting cylinder has a small-diameter stepped portion at an end portion on the one side in the axial direction of an outer peripheral surface thereof.

7. The ball screw device according to claim 4, further comprising:

a housing having an insertion hole through which the nut and the fitting cylinder can be inserted in the axial direction; and a rotation-locking member configured to prevent relative rotation of the nut with respect to the housing; wherein the insertion hole, on an inner peripheral surface thereof, has a guide recessed groove capable of engaging in a circumferential direction with a portion on an outer side with regard to the radial direction of the rotation-locking member and extending in the axial direction;

the nut, on the large-diameter surface, has a holding recessed portion capable of engaging in the circumferential direction with a portion on an inner side with regard to the radial direction of the rotation-locking member, including a blocking surface facing toward the other side in the axial direction, and open to the stepped surface; and the portion on the inner side with regard to the radial direction of the rotation-locking member is arranged inside the holding recessed portion with being sandwiched between the blocking surface and an end surface on the one side in the axial direction of the fitting cylinder, and the portion on the outer side with regard to the radial direction of the rotation-locking member is arranged inside the guide recessed groove so as to slide in the axial direction.

8. The ball screw device according to claim 1, wherein an outer peripheral surface of the fitting cylinder has the second fitting surface, a large-diameter surface arranged adjacent on the other side in the axial direction of the second fitting surface and having an outer diameter larger than that of the second fitting surface, and a stepped surface arranged between the second fitting surface and the large diameter surface and facing the one side in the axial direction; and the fitting cylinder is internally fitted and fixed to the nut, and the stepped surface abuts in the axial direction against an end surface on the other side in the axial direction of the nut.

9. The ball screw device according to claim 8, wherein the nut has a small-diameter stepped portion at an end portion on the other side in the axial direction of the outer peripheral surface.

10. The ball screw device according to claim 8, wherein a housing having an insertion hole through which the nut and the fitting cylinder can be inserted in the axial direction; and a rotation-locking member configured to prevent relative rotation of the nut with respect to the housing; wherein the insertion hole, on an inner peripheral surface thereof, has a guide recessed groove capable of engaging in a circumferential direction with a portion on an outer side in the radial direction of the rotation-locking member and extending in the axial direction;

the fitting cylinder, on the large-diameter surface thereof, has a holding recessed portion capable of fitting in the circumferential direction with a portion on an inner side in the radial direction of the rotation-locking member, including a blocking surface facing toward the one side in the axial direction, and open to the stepped surface; and the portion on the inner side in the radial direction of the rotation-locking member is arranged inside the holding recessed portion with being sandwiched between the blocking surface and the end surface on the other side in the axial direction of the nut, and the portion on the outer side in the radial direction of the rotation-locking member is arranged inside the guide recessed groove so as to slide in the axial direction.

11. The ball screw device according to claim 1, wherein, one of the end portion on the other side in the axial direction of the nut and the end portion on the one side in the axial direction of the fitting cylinder, that covers the retaining ring from outside in the radial direction is provided with a confirmation window hole penetrating in the radial direction at a portion overlapping the retaining ring in the radial direction.

12. The ball screw device according to claim 11 wherein the confirmation window hole is open only on both sides in the radial direction.

13. The ball screw device according to claim 11, wherein the confirmation window hole is open not only on both sides in the radial direction but also in the axial direction.

14. The ball screw device according to claim 11, wherein the retaining ring has a discontinuous portion at one location in the circumferential direction; and a width dimension in the circumferential direction of the confirmation window hole is larger than a width dimension in the circumferential direction of the discontinuous portion.

15. The ball screw device according to claim 11, wherein the retaining ring has a discontinuous portion at one location in the circumferential direction; and the confirmation window hole is respectively provided at a plurality of locations in the circumferential direction of one of the end portions; and an interval between a pair of the confirmation window holes adjacent in the circumferential direction is larger than the width dimension in the circumferential direction of the discontinuous portion.

16. A manufacturing method of a ball screw device according to claim 11, comprising an inspection step of inspecting whether or not the retaining ring is properly assembled;

the inspection step including a step of inserting a tip-end portion of an inspection jig inside the confirmation window hole from outside in the radial direction, and measuring an insertion depth of the tip-end portion of the inspection jig.

* * * * *